US009092776B2

(12) United States Patent
Dessert

(10) Patent No.: US 9,092,776 B2
(45) Date of Patent: Jul. 28, 2015

(54) SYSTEM AND METHOD FOR MANAGING PAYMENT IN TRANSACTIONS WITH A PCD

(75) Inventor: Robert Dessert, Canton, GA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 13/481,766

(22) Filed: May 25, 2012

(65) Prior Publication Data

US 2013/0246258 A1   Sep. 19, 2013

Related U.S. Application Data

(60) Provisional application No. 61/611,344, filed on Mar. 15, 2012.

(51) Int. Cl.
*G06Q 99/00* (2006.01)
*G06Q 20/36* (2012.01)
*G06Q 20/02* (2012.01)
(Continued)

(52) U.S. Cl.
CPC ............ *G06Q 20/367* (2013.01); *G06Q 20/023* (2013.01); *G06Q 20/20* (2013.01); *G06Q 20/202* (2013.01); *G06Q 20/325* (2013.01); *G06Q 20/3226* (2013.01); *G06Q 20/3276* (2013.01); *G06Q 20/3278* (2013.01); *G06Q 20/351* (2013.01); *G06Q 20/3572* (2013.01); *G06Q 20/36* (2013.01); *G06Q 20/385* (2013.01); *G06Q 20/40* (2013.01); *G06Q 20/405* (2013.01); *G06Q 20/3672* (2013.01)

(58) Field of Classification Search
CPC .. G06Q 20/36; G06Q 20/367; G06Q 20/3672

USPC .............................................. 705/26.1, 41, 65
See application file for complete search history.

(56) References Cited

U.S. PATENT DOCUMENTS 5,883,810 A * 3/1999 Franklin et al. ................ 700/232
5,892,900 A * 4/1999 Ginter et al. .................... 726/26
(Continued)

FOREIGN PATENT DOCUMENTS

WO    2009112793 A1    9/2009
WO    2010056480 A1    5/2010
(Continued)

OTHER PUBLICATIONS

International Search Report and Written Opinion—PCT/US2013/029972—ISA/EPO—Jul. 7, 2013.

*Primary Examiner* — James D Nigh
(74) *Attorney, Agent, or Firm* — Nicholas A. Cole

(57) ABSTRACT

A system and method for managing payment in a transaction using a portable computing device ("PCD") includes a mobile wallet token being received from an account issuing entity. Next, the mobile wallet token is stored in memory within a PCD payment platform (i.e., a cloud payment solution). A PCD token that corresponds with the mobile wallet token is generated by the PCD payment platform. The PCD token is transmitted over a communications network to a PCD. The mobile wallet token corresponds to at least one of: a credit card account, an alternative or non-traditional payment account, a stored value account, an account from a financial institution, and a merchant based card account. A mobile wallet token may be generated in response to receiving input from an on-line portal that future use of a payment account with a PCD is desired or in response to input received from a point-of-sale terminal.

18 Claims, 21 Drawing Sheets

(51) Int. Cl.
*G06Q 20/20* (2012.01)
*G06Q 20/32* (2012.01)
*G06Q 20/34* (2012.01)
*G06Q 20/38* (2012.01)
*G06Q 20/40* (2012.01)

(56) References Cited

U.S. PATENT DOCUMENTS

| | | | |
|---|---|---|---|
| 6,351,812 B1 | 2/2002 | Datar et al. | |
| 6,988,657 B1* | 1/2006 | Singer et al. | 235/380 |
| 7,379,919 B2* | 5/2008 | Hogan et al. | 705/64 |
| 7,761,380 B2* | 7/2010 | Katz | 705/44 |
| 8,112,353 B2* | 2/2012 | Li et al. | 705/39 |
| 8,549,279 B1* | 10/2013 | Sahasranaman et al. | 713/150 |
| 8,682,802 B1* | 3/2014 | Kannanari | 705/65 |
| 2001/0051915 A1 | 12/2001 | Ueno et al. | |
| 2002/0026582 A1 | 2/2002 | Futamura et al. | |
| 2005/0097060 A1* | 5/2005 | Lee et al. | 705/65 |
| 2007/0125838 A1 | 6/2007 | Law et al. | |
| 2008/0071680 A1* | 3/2008 | Sheets | 705/39 |
| 2008/0255986 A1* | 10/2008 | Scarborough et al. | 705/38 |
| 2008/0283591 A1* | 11/2008 | Oder et al. | 235/380 |
| 2009/0068982 A1 | 3/2009 | Chen et al. | |
| 2009/0134217 A1 | 5/2009 | Flitcroft et al. | |
| 2009/0240620 A1* | 9/2009 | Kendrick et al. | 705/39 |
| 2009/0294527 A1* | 12/2009 | Brabson et al. | 235/380 |
| 2010/0030697 A1* | 2/2010 | Goodrich et al. | 705/75 |
| 2010/0094755 A1* | 4/2010 | Kloster | 705/44 |
| 2010/0125510 A1 | 5/2010 | Smith et al. | |
| 2010/0140347 A1 | 6/2010 | Madani | |
| 2010/0180327 A1 | 7/2010 | Sheets et al. | |
| 2010/0217674 A1* | 8/2010 | Kean | 705/17 |
| 2010/0257612 A1* | 10/2010 | McGuire et al. | 726/26 |
| 2010/0276484 A1 | 11/2010 | Banerjee et al. | |
| 2011/0161233 A1* | 6/2011 | Tieken | 705/71 |
| 2011/0208659 A1* | 8/2011 | Easterly et al. | 705/79 |
| 2011/0251892 A1* | 10/2011 | Laracey | 705/14.51 |
| 2011/0307710 A1* | 12/2011 | McGuire et al. | 713/183 |
| 2012/0005038 A1* | 1/2012 | Soman | 705/26.41 |
| 2012/0011009 A1 | 1/2012 | Lindsey et al. | |
| 2012/0041881 A1* | 2/2012 | Basu et al. | 705/67 |
| 2012/0078782 A1* | 3/2012 | Schoenberg et al. | 705/40 |
| 2012/0160912 A1 | 6/2012 | Laracey | |
| 2012/0203700 A1* | 8/2012 | Ornce et al. | 705/67 |
| 2012/0259781 A1* | 10/2012 | Fote et al. | 705/44 |
| 2012/0267432 A1* | 10/2012 | Kuttuva | 235/379 |
| 2012/0289188 A1 | 11/2012 | Marcus et al. | |
| 2012/0303425 A1 | 11/2012 | Katzin et al. | |
| 2013/0031006 A1* | 1/2013 | McCullagh et al. | 705/66 |
| 2013/0091061 A1* | 4/2013 | Caulkett et al. | 705/65 |
| 2013/0097081 A1* | 4/2013 | Leavitt et al. | 705/44 |
| 2013/0110658 A1* | 5/2013 | Lyman et al. | 705/18 |
| 2013/0246259 A1 | 9/2013 | Dessert | |
| 2013/0275308 A1* | 10/2013 | Paraskeva et al. | 705/71 |
| 2014/0032419 A1* | 1/2014 | Anderson et al. | 705/78 |

FOREIGN PATENT DOCUMENTS

| | | |
|---|---|---|
| WO | 2010126509 A2 | 11/2010 |
| WO | WO2010/126509 A2 * | 11/2010 |
| WO | WO2011113121 | 9/2011 |
| WO | WO2012021864 | 2/2012 |

* cited by examiner

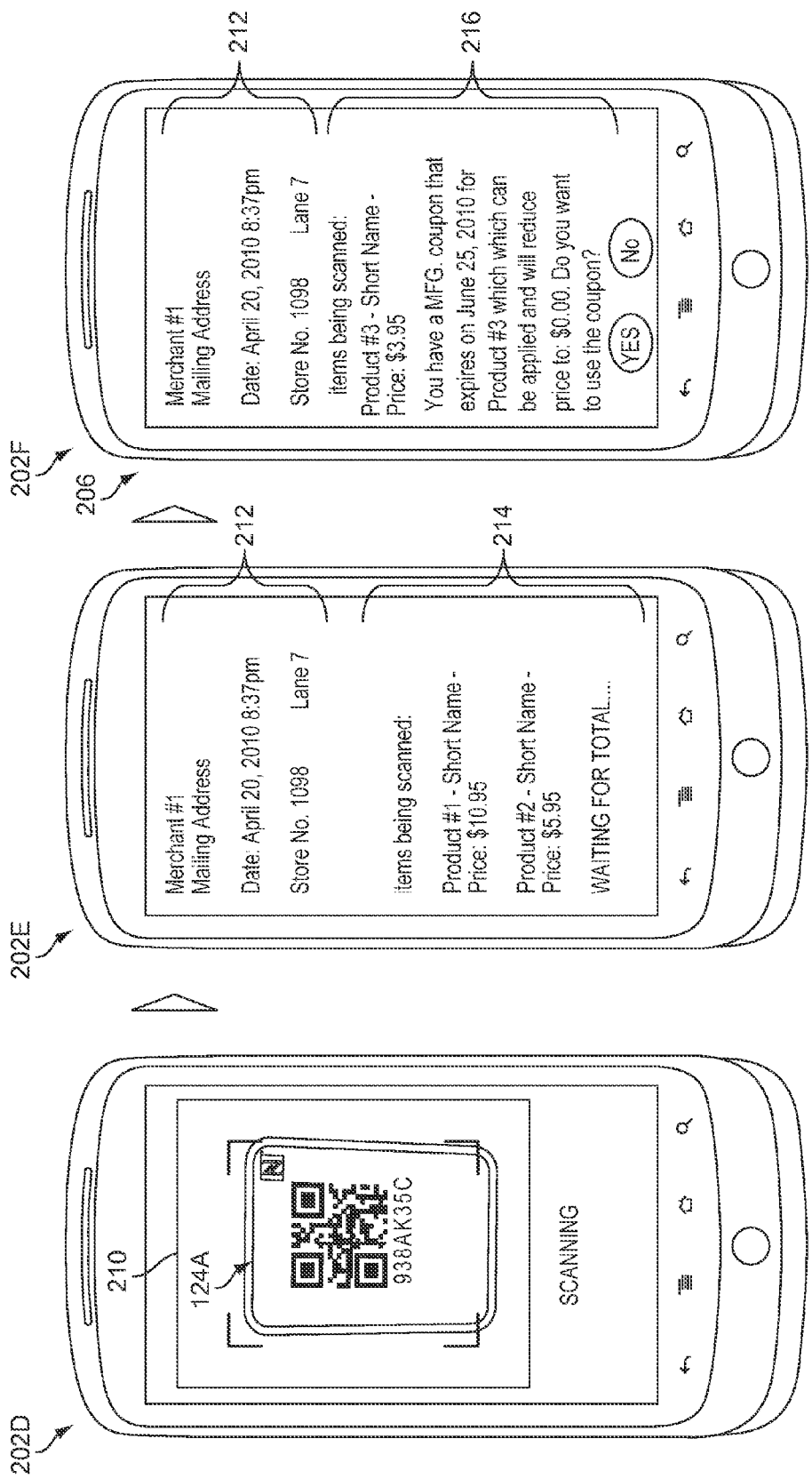

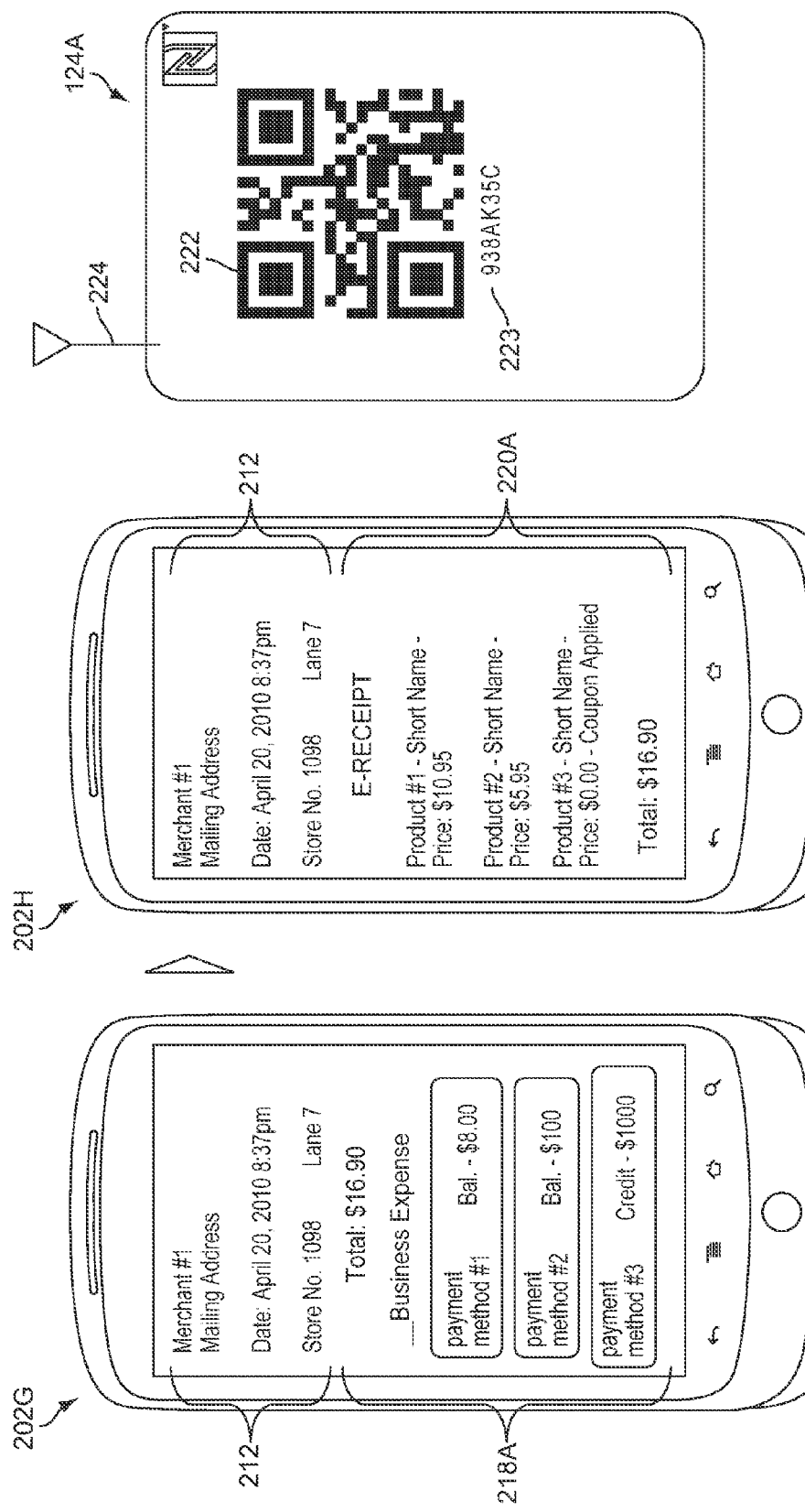

28, 30, 32

WELCOME TO YOUR ACCOUNT(S)
MANAGEMENT WEBPAGE

ACCOUNT # 1 (ending in 1234)..............$2400
ACOOUNT # 2 (ending in 5678).............$10,000

USE ACCOUNT #1 FOR MOBILE PAYMENTS? — 28F1
☐ YES  ☒ NO

USE ACCOUNT #2 FOR MOBILE PAYMENTS? — 28F2
☒ YES  ☐ NO

FIG. 7C

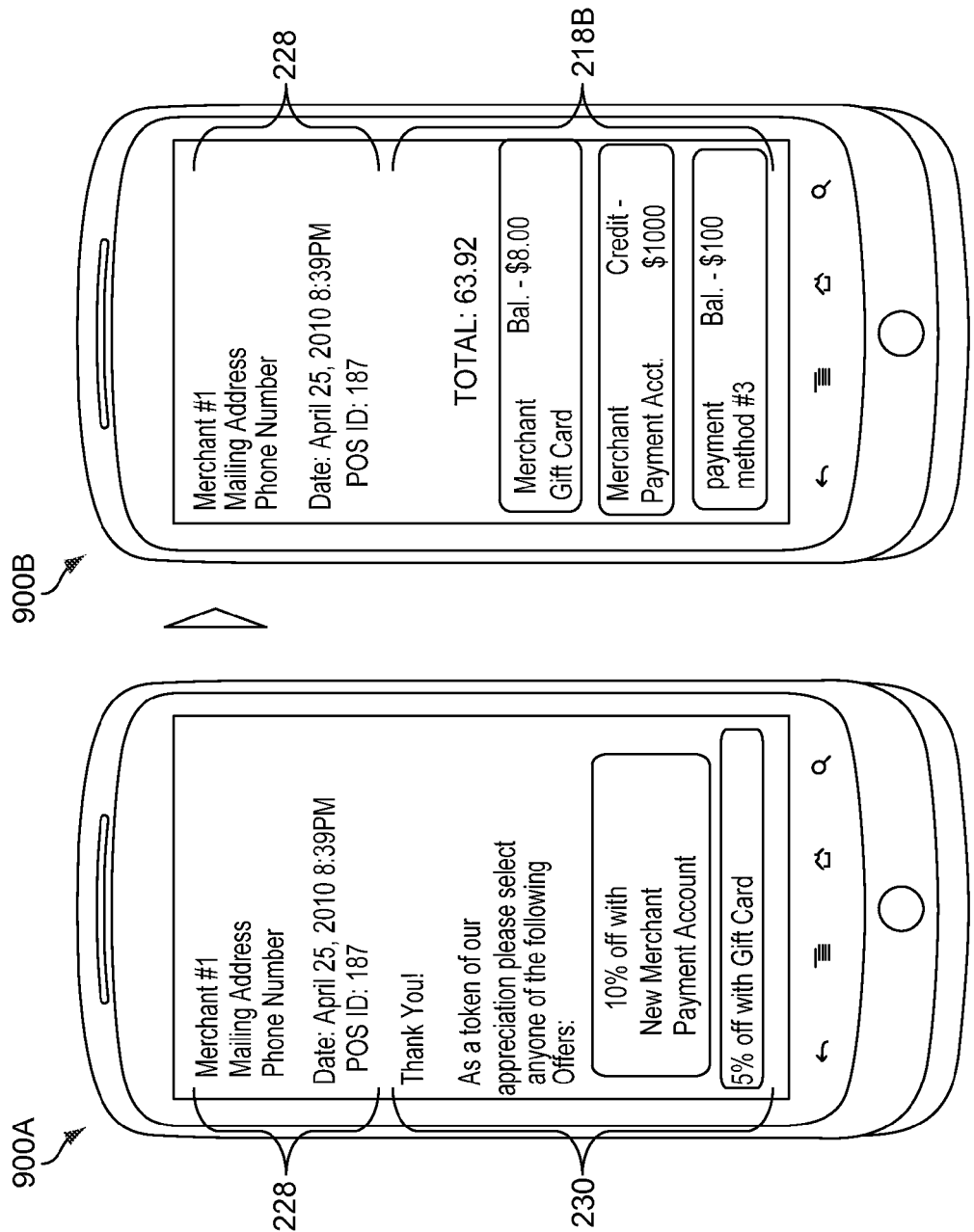
FIG. 9A / FIG. 9B

SYSTEM AND METHOD FOR MANAGING PAYMENT IN TRANSACTIONS WITH A PCD

PRIORITY AND RELATED APPLICATIONS STATEMENT

This patent application claims priority under 35 U.S.C. §119(e) and is related to U.S. Provisional Patent Application Ser. No. 61/611,344, filed on Mar. 15, 2012, entitled, "System and Method For Managing Payment In Transactions With A PCD," the entire contents of which are hereby incorporated by reference.

DESCRIPTION OF THE RELATED ART

Portable computing devices (PCDs) are becoming necessities for people on personal and professional levels. These devices may include cellular telephones, portable digital assistants (PDAs), portable game consoles, palmtop computers, and other portable electronic devices.

PCDs are often utilized to conduct financial transactions. For example, PCDs may be used to check bank account balances, transfer funds between bank accounts, and for paying bills. While PCDs are useful for these types of transactions, there is a growing need in the art for utilizing PCDs in other types of transactions.

These other types of transactions may include those in which physical tokens, such as credit cards, gift cards, and stored value cards, are typically used. One problem faced by many consumers is that each consumer may be issued a separate account corresponding to a single merchant or single service provider. Often, the merchant or service provider will send each consumer a physical token that corresponds to the account. Each physical token typically has account information provided on it as well as machine-readable codes so that point-of-sale ("POS") terminals can easily process these machine-readable codes.

In addition to machine-readable codes, each physical token usually has human-readable codes as a back-up for the machine-readable code if the machine-readable code fails for a particular transaction. In some instances, a merchant or service provider may not have a machine reader to read the machine-readable code. In such scenarios, the human-readable code may be used.

Physical tokens may also be required by merchants or service providers as a form of identification of the consumer and his or her corresponding account. Often, physical tokens may be required by a merchant or service provider so that any value associated with the token may be redeemed by the consumer.

If a consumer has a plurality of accounts, such as on the order of five or more, then the consumer will likely carry the same amount of physical tokens on his or her person. This can be problematic because the physical tokens do consume space and do require the consumer to remember to carry them on his or her person. If a consumer has ten or more accounts which corresponds to ten or more physical tokens, then the management of these physical tokens becomes significantly burdensome and problematic for the consumer.

Accordingly, what is needed is a system and method that may overcome the problems associated with physical tokens. Specifically, a system and method is needed for eliminating the use of physical tokens for various types of transactions so that a consumer may track one or more accounts with merchants and/or service providers with ease using a single PCD.

SUMMARY OF THE DISCLOSURE

According to one exemplary aspect of the system and method, a mobile wallet token is received from an account issuing entity. Next, the mobile wallet token is stored in memory within a portable computing device payment platform. A portable computing device token that corresponds with the mobile wallet token is generated by the portable computing device payment platform. The portable computing device token is transmitted over a communications network for use in transactions in which an operator selects a portable computing device to make a payment. The mobile wallet token corresponds to at least one of: a credit card account, an alternative or non-traditional payment account, a stored value account, an account from a financial institution, and a merchant based card account.

Each mobile wallet token may be generated in response to receiving input from a point-of-sale system that future use of a payment account with the portable computing device is desired. Alternatively, a mobile wallet token may be generated by an account issuing entity in response to receiving input from an on-line portal that future use of a payment account with the portable computing device is desired.

With the mobile wallet tokens and PCD tokens managed by the PCD payment platform, this structure offers at least two layers of security for credit card or other type of payment account data. The mobile wallet tokens and the PCD tokens may not contain any relevant account data. The correspondence or relevance of PCD tokens to their matching mobile wallet tokens is only known to the PCD payment platform. Similarly, the correspondence or relevance of mobile wallet tokens to actual payment accounts (i.e. credit card accounts, gift card accounts, bank accounts, etc.) is only known to the account issuing entity, like the alternative payment systems, credit card systems, bank card systems, and vaults. As described above, these account issuing entities are responsible for generating the mobile wallet tokens.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 2D is a diagram of a screen that shows the contents of an image being scanned with a camera of the PCD;

FIG. 2E is a diagram of a screen that shows merchant information relevant to a transaction and a line item listing of products being scanned by a product scanner coupled to an electronic cash register;

FIG. 2F is a diagram of a screen that shows merchant information relevant to a transaction and a coupon option that may be selected by a user;

FIG. 2G is a diagram of a screen that shows merchant information relevant to a transaction and a total bill for a purchase along with a plurality of payment options that may be selected by a user;

FIG. 2H is a diagram of a screen that shows an electronic receipt that may be provided upon completion of a transaction with a merchant;

FIG. 2I is a diagram of an exemplary machine-readable tag that may be coupled to an electronic cash register of a merchant;

FIG. 7C is a diagram illustrating an exemplary account on-line (web) management portal for generating mobile wallet tokens;

FIG. 9A is a diagram of a screen that shows merchant information relevant to a transaction and a total bill for a purchase along with a plurality of offers which were generated by a tender steering algorithm; and FIG. 9B is a diagram of a screen that shows merchant information relevant to a transaction and a total bill for a purchase along with a plurality of payment options that may be selected by user and which were re-ordered by a tender steering algorithm.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer, like a tablet PC, with a wireless connection or link.

Figure 1:
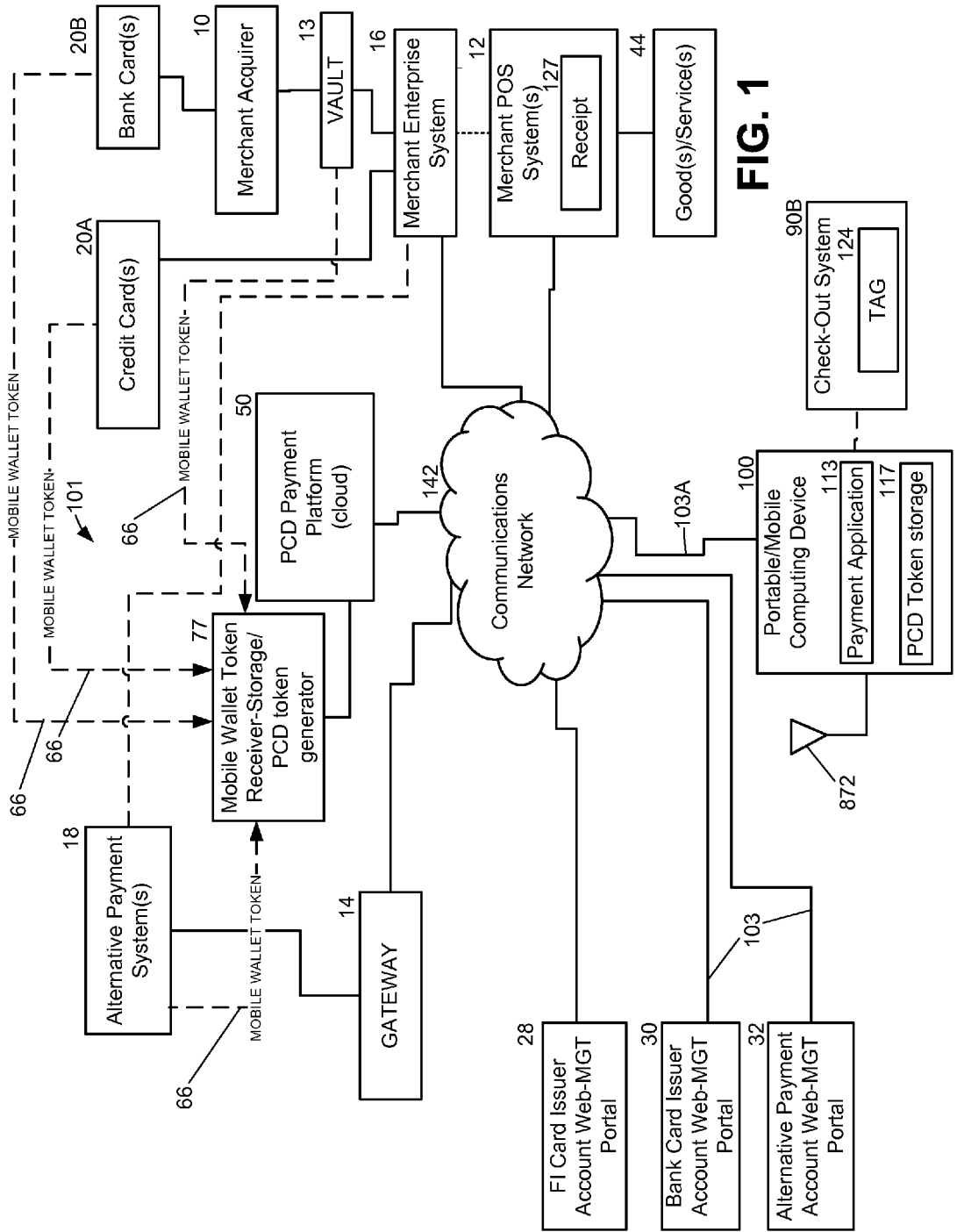
FIG. 1 is a diagram of a wireless portable computing device ("PCD") coupled to a wireless communications network which are integral parts of a system for managing payment transactions with the portable computing device.

Referring initially to FIG. 1, this figure is a diagram of a wireless portable computing device ("PCD") 100 coupled to a communications network 142 via a wireless communication link 103A which are integral parts of a system 101 (also referred to herein as a transaction management system 101) for managing transactions with the portable computing device 100.

Many of the system elements illustrated in FIG. 1 are coupled via communication links 103 to the communications network 142. The communication links 103 illustrated in FIG. 1 may comprise wired or wireless links. Wireless links include, but are not limited to, radio-frequency ("RF") links, infrared links, acoustic links, and other wireless mediums. The communications network 142 may comprise a wide area network ("WAN"), a local area network ("LAN"), the Internet, a Public Switched Telephony Network ("PSTN"), a paging network, or a combination thereof.

The communications network 142 may be established by broadcast RF transceiver towers (not illustrated). However, one of ordinary skill in the art recognizes that other types of communication devices besides broadcast RF transceiver towers are included within the scope of this disclosure for establishing the communications network 142.

The PCD 100 is shown to have a RF antenna 872 (see FIG. 8) so that a respective PCD 100 may establish a wireless communication link 103A with the communications network 142 via RF transceiver towers (not illustrated). The portable computing device (PCD) 100 may support a payment application 113 that may reside in memory 803 (See FIG. 8) of the PCD 100. The PCD 100 may also include PCD token storage 117 that may be part of and/or in addition to memory 803. The PCD token storage 117 may contain PCD tokens issued by the PCD payment platform (cloud) 50 as will be described in further detail below.

The payment application 113 may allow the PCD 100 to communicate with the PCD payment platform 50 over the communications network 142. The payment application 113 may also allow the PCD 100 to collect information from a machine-readable tag 124 (also referred to herein as tag 124) that may be coupled to an electronic cash register ("ECR") 412 (not illustrated in FIG. 1, but see FIG. 4) of a check-out system 90B. Further details about the check-out system 90B will be described below in connection with FIG. 3A.

The machine-readable tag 124 may comprise a unique merchant identifier and a unique terminal (or electronic cash register) identifier that helps the PCD 100 to manage point-of-sale (POS) transactions. Further details about the machine-readable tag 124 will be described below in connection with FIG. 2I. The ECR 412 (not illustrated in FIG. 1, but see FIG. 4) of the Merchant POS system 12 may comprise a mechanical or electronic device or combination thereof for calculating and recording sales transactions. The ECR 412 of the merchant POS system 12 may produce a physical receipt 127 at the end of a transaction that lists goods and/or services purchased with the portable computing device 100. Further details about the merchant POS system 12 will be described below in connection with FIG. 4.

The merchant POS system 12 may be coupled to the merchant enterprise system 16 via the communications network 142. The merchant enterprise system 16 may support the completion of transactions when credit cards or when bank cards have been selected as a form of payment for a particular transaction. The merchant enterprise system 16 may be coupled to a vault 13. Vault 13 may be coupled both to the merchant enterprise system 16 and the merchant acquirer. The vault 13 may comprise a secure database of credit card data that may be used in later/future transactions as desired by an account holder. The vault 13 may also issue mobile wallet tokens that are sent to module 77 of the PCD payment platform as will be described in further detail below. Further details about the merchant enterprise system 16 will be described below in connection with FIG. 4.

The merchant enterprise system 16 may be coupled to a merchant acquirer 10 and one or more credit card systems 20A. The merchant acquirer 10 may be coupled to one or more bank card systems 20B supported by financial institutions like banks. Further details about the merchant acquirer 10, the credit card systems 20A, and bank card systems 20B will be described below in connection with FIG. 5.

The merchant enterprise system 16 may also be coupled to alternative payment systems 18. Alternative payment systems 18 may include, but are not limited to, such systems like PAYPAL™, Google payments, etc. that currently exist as of this writing. The alternative payment systems 18 may be coupled to a gateway 14. Further details about the alternative payment systems 18 and gateway 14 will be described below in connection with FIG. 6.

A PCD payment platform 50, which may also be referred to as a cloud payment solution as understood by one of ordinary skill in the art, is coupled to the portable computing device 100 via the communications network 142. The PCD payment platform 50 is responsible for connecting or linking the portable computing device 100 to the merchant POS system 12 and merchant enterprise system 16.

The PCD payment platform may further comprise a mobile wallet token receiver-storage/PCD token generator module 77. Module 77 of PCD payment platform 50 may be responsible for receiving and storing mobile wallet tokens that are generated by the vault 13 of a merchant, alternative payment systems 18, credit card systems 20A, and bank card systems 20B.

The vault 13 of a merchant may issue a mobile wallet token to module 77 if an account holder indicates during a payment transaction with a traditional credit card, gift card, bank card, etc, using the merchant POS system 12 that he or she desires the payment account to be used in future transactions with the account holder's PCD 100. The POS system 12 may prompt the account holder for this information during a routine transaction.

The alternative payment systems 18, credit card systems 20A, and bank card systems 20B, may issue a mobile wallet token to module 77 if an account holder indicates such action by using an online payment portal, such as portals 28, 30, 32 as illustrated in FIG. 1. Specifically, each online payment portal 28, 30, 32 may have an option for allowing payments in transactions using a PCD 100 as illustrated in FIG. 7C, described in further detail below.

The generation and delivery of the mobile wallet tokens are illustrated by dashed lines 66 that exist between module 77 and these account issuing entities (vault 13, alternative payment systems 18, credit card systems 20A, and bank card systems 20B). Module 77 is also responsible for generating PCD tokens that correspond with the mobile wallet tokens which are received from the account issuing entities. The PCD tokens are transmitted to a PCD 100 for storage on the PCD 100. The PCD tokens represent the payment accounts which may be accessed with the PCD 100 when the operator of the PCD 100 desires to complete a transaction with the PCD 100, such as at the point-of-sale system 12.

With the mobile wallet tokens and PCD tokens managed by module 77 of the PCD payment platform, this structure offers at least two layers of security for credit card or other type of payment account data. The mobile wallet tokens and the PCD tokens may not contain any relevant account data. The correspondence or relevance of PCD tokens to their matching mobile wallet tokens is only known to the PCD payment platform 50.

Similarly, the correspondence or relevance of mobile wallet tokens to actual payment accounts (i.e. credit card accounts, gift card accounts, bank accounts, etc.) is only known to the account issuing entity, like the alternative payment systems 18, credit card systems 20A, bank card systems 20B, and vaults 13. These account issuing entities 13, 18, 20A, 20B are responsible for generating the mobile wallet tokens. Further details about the PCD payment platform 50 will be described below in connection with FIG. 7A.

An operator (also referred to as a PCD consumer) of the PCD 100 may physically enter an establishment of a merchant, such as a store. The operator may "check-in" with the merchant's enterprise system 16 using his or her PCD 100.

Once "checked-in", the payment application 113 running on the PCD 100 may provide a unique or personalized list of products/services, such as "daily specials," for the PCD consumer available for purchase that is generated by the merchant enterprise system 16 working in conjunction with the PCD payment platform 50.

The payment application 113 may allow the PCD consumer to scan-in bar codes associated with products/services 44 that the PCD consumer may desire to purchase which are located within the establishment of the merchant. After a PCD consumer scans-in a product and/or service, the payment application 113 working in conjunction with the PCD payment platform 50 may provide personalized prices for the product and/or service which are significantly less than the ticketed price of the product or service. Further, the payment application 113 may suggest an ensemble of products or services that may or may not be related to the scanned-in product or service which may be of interest to the PCD consumer.

The payment application 113 running on the PCD 100 may support a wishlist of products and/or services that a PCD consumer is interested in but may not purchase until a future time. The payment application 113 may also support a virtual shopping cart or virtual shopping basket that may contain products and/or services that the PCD consumer desires to purchase before leaving the establishment of the merchant. The payment application 113 may track a running total cost for the goods/products that the PCD consumer intends to purchase.

Figure 4:
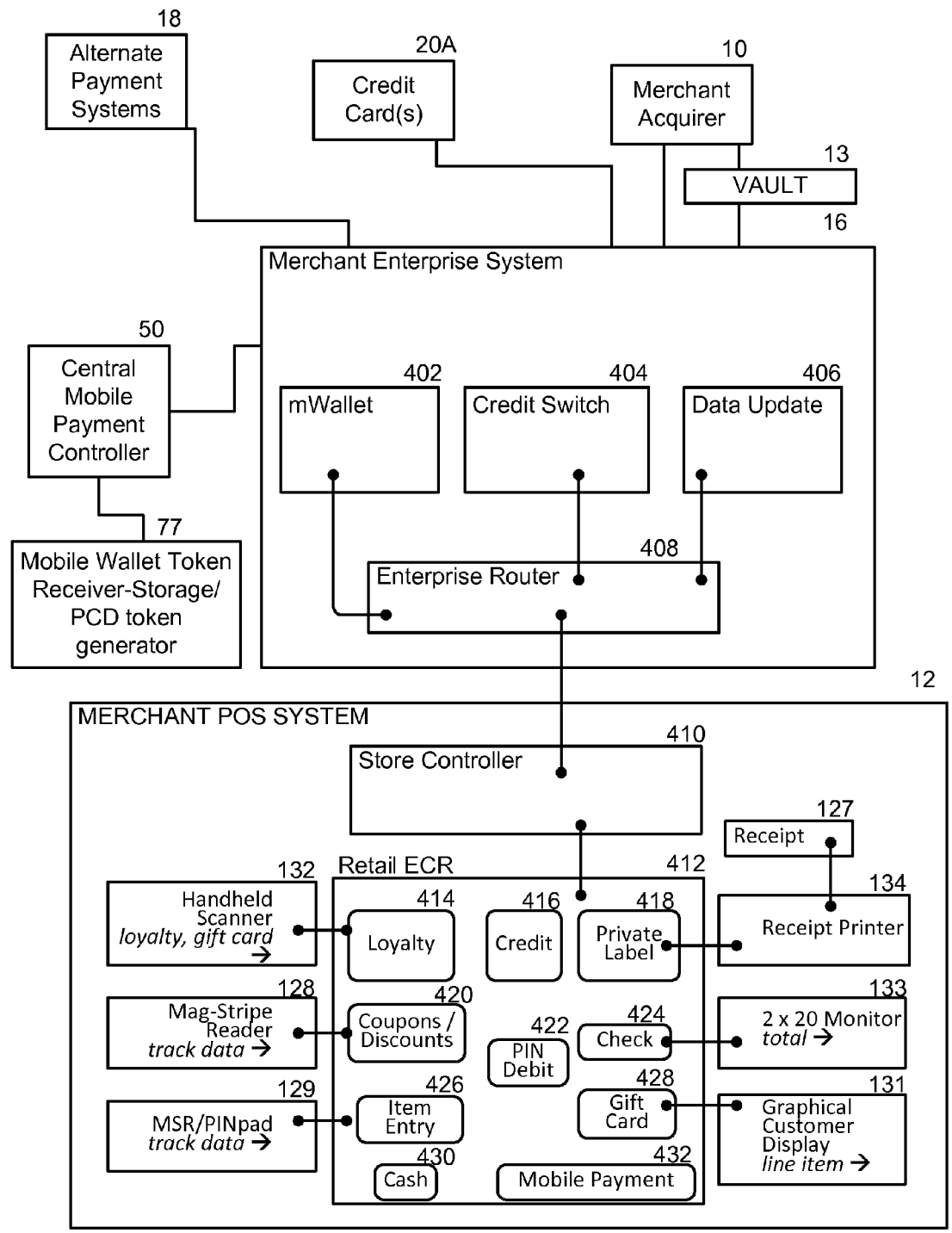
FIG. 4 is a diagram illustrating details for the merchant point-of-sale system and the merchant enterprise system of FIG. 1 for completing a sales transaction.

When the PCD consumer is ready to purchase the products and/or services in the virtual shopping cart or shopping basket, the PCD consumer may proceed to check-out where the products and/or services may be scanned with a product scanner 132 (See FIG. 4). Prior to or in parallel to the operation of scanning products with the product scanner 132, the operator of the PCD 100 may retrieve the unique terminal identifier and the merchant identifier associated with a tag 124 of a check-out system 90B which is affixed to the ECR 412 of the Merchant POS system 12.

The machine-readable tag 124 may comprise a machine-readable code 222 which may be scanned with a camera 848 (See FIG. 8) of the PCD 100. A payment application 113 running on the PCD 100 may be able to process the scanned machine-readable code 222. The machine-readable code 222 may comprise either a one dimensional or two-dimensional barcode. Further, other machine-readable codes are included within the scope of the invention and may include contactless technologies, such as near-field communications (NFC), WiFi, acoustic, which may or may not be linked to a secure-element, and RFID cards as understood by one of ordinary skill in the art. For these contactless technologies, the tag 124 may comprise an antenna 224 coupled to an integrated-circuit chip (not illustrated).

This unique terminal (or ECR) identifier and merchant identifier retrieved by the PCD 100 may be relayed back to the PCD payment platform 50 along with a personal identification number ("PIN"). In response to receiving the terminal identifier, merchant identifier, and PIN, the PCD payment platform 50 may send messages to merchant enterprise system 16 that may include an identifier corresponding to the operator of the PCD 100. The PCD payment platform 50 may request the merchant enterprise system 16 for the product scan data being generated by the product scanner 132 of the merchant POS system 12.

In response to this request from the PCD payment platform 50, merchant enterprise system 16 may forward the product scan data to the PCD payment platform 50. The PCD payment platform 50, in turn, may relay the product scan data to the PCD 100 so that the product scan data may be displayed on the display device of the PCD 100. The PCD 100 may provide an option that may be selected by an operator to turn off this product scan data from being displayed on the display device of the PCD 100 while the products 130A are being scanned. This product scan data may be displayed adjacent to the personalized pricing that was previously calculated and displayed while the PCD consumer was shopping.

Meanwhile, when the product scanner 132 of the merchant POS system 12 is finished scanning the products/services 44 for purchase, the ECR 412 may generate a final total of money due for payment in connection with the purchase of the products/services 44. This final total data is communicated from the merchant POS system 12 to the merchant enterprise system 16. Based on the identifier associated with the operator of the PCD 100 received from the PCD payment platform 50, the merchant enterprise system 16 and/or vault 13 may determine if the operator has one or more accounts stored in the vault 13. The merchant enterprise system 16 then relays the final total to the PCD payment platform 50 along with a message which indicates if the operator has one or more accounts in vault 13. In addition to relaying this final total data to the PCD 100, the PCD payment platform 50 may also retrieve payment accounts available to the operator and that may have been selected by an operator in a predetermined order for display on the PCD 100 and/or which were identified by the merchant enterprise system 16 and/or vault 13. Alternatively, or in addition, the system 101 via the tender steering module 744 of the PCD payment platform 50 may list the payment accounts in a predetermined order or sequence as will be described below in connection with FIG. 7A.

At this time, or any time during the transaction cycle, an operator of the PCD 100 may select from one of a plurality of payment methods supported by the PCD payment platform 50 and which are displayed on the PCD 100. Alternatively, an operator of the PCD 100 may select a plurality of payment methods in order to pay the final total due in connection with the purchased products/services 44. Once a payment method or a combination of methods are selected by an operator of the PCD 100, the PCD 100 relays one or more PCD tokens corresponding to the selected accounts to the PCD payment platform 50.

When any form of payment is selected by the operator of the PCD 100, such as the selection of a credit card account, then the PCD payment platform 50 may match the PCD token that it receives from the PCD 100 with a mobile wallet token that was previously loaded in the mobile wallet token receiver/PCD token generator module 77. The PCD payment platform may then relay the mobile wallet token matching the PCD token over a secure channel to the merchant enterprise system 16.

The merchant enterprise system 16 may relay the mobile wallet token to the vault 13. If there is a matching merchant acquirer token in the vault 13 corresponding to the mobile wallet token received from the PCD payment platform 50, then the vault 13 may relay the merchant acquirer token to the merchant acquirer 10 for bank card systems 20B. Alternatively, the vault 13 and/or merchant enterprise system 16 may relay the mobile wallet token to credit card networks for credit card systems 20A. If an alternative payment mobile wallet token is received, such as corresponding to PAYPAL™, then the merchant enterprise system 16 may relay this mobile wallet token to the alternative payment systems 18 via the gateway 14.

Exemplary credit card networks, may include, but are not limited to, the VISA™ credit card network, the MASTERCARD™ card network, the DISCOVER™ credit card network, the AMERICAN EXPRESS™ credit card network, and other similar charge card proprietary networks. One of ordinary skill in the art recognizes that transactions for merchant gift cards may also follow the same flow with the merchant enterprise system 16 directing the transaction to the merchant's stored value processor that may be part of the credit card systems 20A or alternative payment systems 18.

If payment is approved by one of the traditional payment systems 20 or the alternative payment system 18, then the merchant enterprise system 16 may relay this approval message to the merchant POS system 12. The merchant POS system 12 relays the approval message to the electronic cash register 126 and to the PCD payment platform 50. If payment is approved by one of the alternative payment systems 18, the PCD payment platform 50 may relay this information to the PCD 100 and the merchant enterprise system 16.

The PCD payment platform 50 may send any payment approval messages to the PCD 100 for display on the display device of the PCD 100. The PCD payment platform 50 may generate an electronic receipt that can be forwarded and displayed on a display device of the PCD 100. Meanwhile, the ECR 412 may also generate a hard copy receipt 127.

Figures 2A, 2B, 2C:
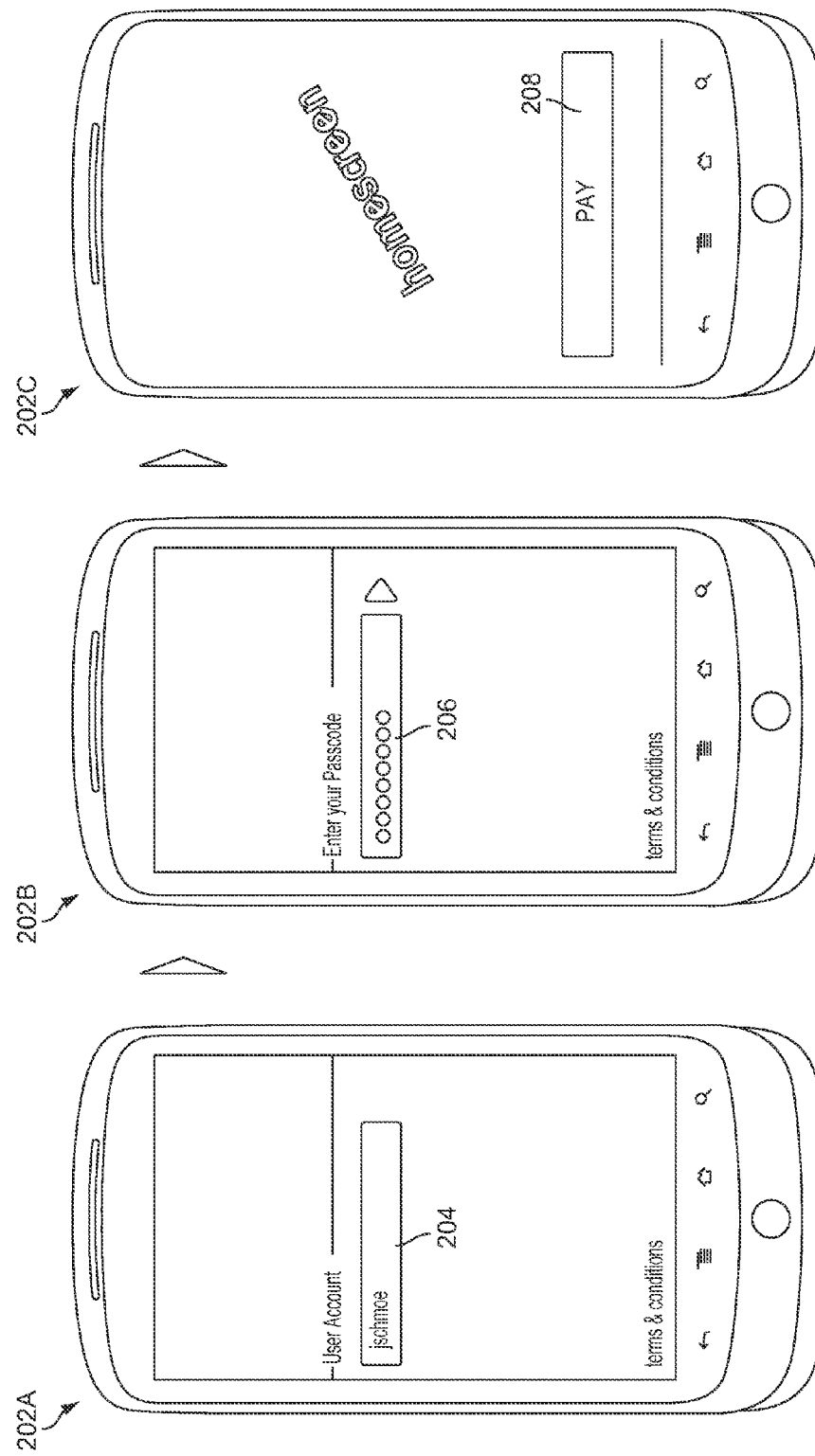
FIG. 2A is a diagram of a screen for entering a user's log-in credentials on the PCD to access the system.
FIG. 2B is a diagram of a screen for entering additional log-in credentials such as a password on the PCD to access the system.
FIG. 2C is a diagram of a screen for the PCD confirming access to system.

FIG. 2A is a diagram of a screen 202A of the PCD 100 for entering a user's log-in credentials, such as a user name 204 on the PCD 100 to access the system 101. The user's log-in credentials 204 may comprise a unique user name selected by an operator of the PCD 100. When the user name is entered by the operator of the PCD 100, the PCD payment platform 50 may verify that the user name entered and a unique identifier assigned to the PCD 100 match by checking client profiles which may be stored in the eWallet module 732F (See FIG. 7A). One of ordinary skill in the art recognizes that authentication of the operator of the PCD 100 at this stage may include other security measures beyond just a user name/password. Other security measures which may be used as alternatives or as supplemental security measures to those already described include, but are not limited to, biometrics, secure elements such as integrated-circuit (IC) cards or smart cards, and other like methods in the art of multi-factor authentication.

If the user name and unique identifier assigned to the PCD 100 do not match, then the PCD payment platform 50 may deny entry to the system 101 and prompt the user for correct credentials for a predetermined number of times. If the user name and unique identifier assigned to the PCD 100 do match, then the PCD payment platform 50 may prompt the operator of the PCD 100 for a password 206 associated with the user name on the account such as illustrated in FIG. 2B.

FIG. 2B is a diagram of a screen 202B for entering additional log-in credentials such as a password 206 on the PCD 100 to access the system 101. If the correct password 206 is not entered by an operator of the PCD 100 after a predetermined number of times, the PCD payment platform 50 may lock out the account associated with the user name that was entered in the screen 202A of FIG. 2A. If the correct password 206 is entered by an operator of the PCD 100, then the PCD payment platform 50 may generate a welcome screen 202C such as illustrated in FIG. 2C.

FIG. 2C is a diagram of a screen 202C for the PCD 100 confirming access to system 101. The welcome screen 202C may also comprise an execution button 208 that may activate the payment application 113 residing on and supported by the PCD 100. Upon selecting the execution button 208, the PCD 100 may launch the payment application 113 running on the PCD 100 which causes the PCD 100 to generate the next screen 202D as illustrated in FIG. 2D.

FIG. 2D is a diagram of a screen 202D that shows the contents of an image 210 being scanned with a camera 848 of the PCD 100. The image 210 being scanned by the camera 848 (See FIG. 8 for camera) may comprise one of the tags 124 of FIG. 1. As noted previously, the tag 124 of FIG. 1 may comprise machine-readable data such as a two-dimensional barcode that contains a unique identifier associated with a particular electronic cash register 126 and a particular merchant. The 2-D bar code may include, but is not limited to, the following symbologies: Aztec Code, 3-DI, ArrayTag, Small Aztec Code, Chromatic Alphabet, Chromocode, Codablock, Code 1, Code 16K, Code 49, ColorCode, Compact Matrix Code, CP Code, CyberCode, d-touch, DataGlyphs, Datamatrix, Datastrip Code, Dot Code A, EZcode, Grid Matrix Code, High Capacity Color Bar code, HueCode, INTACTA.CODE, InterCode, MaxiCode, mCode, MiniCode, Micro PDF417, MMCC, Nintendo e-Reader#Dot code, Optar, PaperDisk, PDF417, PDMark, QR Code, QuickMark Code, Semacode, SmartCode, Snowflake Code, ShotCode, SuperCode, Trillcode, UltraCode, UnisCode, VeriCode, VSCode, WaterCode, for example.

Instead of a two dimensional bar code, a one dimensional bar code may be employed to provide the unique electronic cash register identifier and the unique identifier associated with the merchant. Exemplary one-dimensional bar codes may include, but are not limited to, U.P.C., Codabar, Code 25—Non-interleaved 2 of 5, Code 25—Interleaved 2 of 5, Code 39, Code 93, Code 128, Code 128A, Code 128B, Code 128C, Code 11, CPC Binary, DUN 14, EAN 2, EAN 5, EAN 8, EAN 13, Facing Identification Mark, GS1-128 (formerly known as UCC/EAN-128), GS1 DataBar formerly Reduced Space Symbology ("RSS"), HIBC (HIBCC Bar Code Standard), ITF-14, Latent image bar code, Pharmacode, Plessey, PLANET, POSTNET, Intelligent Mail Bar code, MSI, PostBar, RM4SCC/KIX, JAN, and Telepen. Other machine readable codes for retrieving the unique identifiers associated with the electronic cash register 126 and merchant are well within the scope of the invention such as contact-less or wireless communication methods such as near-field communications (NFCs) used with smart cards and RF-ID cards as understood by one of ordinary skill in the art. Further, in another exemplary embodiment, the operator of the PCD 100 may key-in a human-readable code 223 associated with the unique identifier of the electronic cash register 126 and the merchant.

FIG. 2E is a diagram of a screen 202E that shows merchant information 212 relevant to a transaction and a line item listing 214 of products during check-out being scanned by a product scanner 132 coupled to an ECR 412 (See FIG. 4). The merchant information 212 may comprise information such as, but not limited to, a merchant name, a mailing address of the store, date and time data relevant to the transaction, a store number, and an electronic cash register number, and other like information. The line item listing 214 of product scan data may comprise information such as, but not limited to, a product number, a short name for the product, a price and other similar information. According to an exemplary embodiment, an operator of the PCD 100 may shut "off" the line item listing 214 as a user defined preference which may be stored in the second storage device 146B.

While the product scanner 132 (of FIG. 4) is scanning the machine-readable product codes from the products/services 44, the PCD payment platform 50 may match these machine-readable product codes with coupon data retrieved from the offer/coupon system (not illustrated), which was made while the PCD consumer was shopping previously. The offer/coupon system may include one or more client profiles associated with the PCD 100.

FIG. 2F is a diagram of a screen 202F that shows merchant information relevant to a transaction and a coupon option 216 that may be selected by an operator of the PCD 100. Screen 202F may be generated in response to the PCD payment platform 50 determining a match between a coupon retrieved from the offer/coupon system and products/services 44 being scanned. Screen 202F may list merchant information 212 and the coupon option 216 which prompts the operator of the PCD 100 to decide whether or not to use a coupon that matches a product 130 which was scanned by the product scanner 132A. This coupon option 216 may be turned off by an operator of the PCD 100 so that this screen 202F is not generated when a match is found by the PCD payment platform 50.

An operator of the PCD 100 may allow automatic matching of coupons as they are discovered by the PCD payment platform 50. In the exemplary screen 202F, the operator of the PCD 100 is asked to decide whether or not to use a manufacturer's coupon that may reduce the price of purchase for products/services 44 to zero. If the operator of the PCD 100 decides not to use the coupon, then the coupon data may remain in storage accessible by the PCD payment platform 50 until another match is found by the PCD payment platform 50.

FIG. 2G is a diagram of a screen 202G that shows merchant information 212 relevant to a transaction and a total bill for a purchase along with a plurality of payment options 218A that may be selected by the operator. In the example illustrated in FIG. 2G, the total amount due for the purchase is $16.90. The payment options 218A allow a user to select the expense as a business expense towards taxes. The payment options 218A also allow an operator of the PCD 100 to select among a plurality of payment methods that may have been previously selected by the operator and stored in a user's profile.

In other words, prior to conducting any transactions, an operator of the PCD 100 may arrange a predetermined listing of the sequence of payment methods which should be displayed to an operator of the PCD 100 whenever the operator employs the PCD 100 for a transaction. The operator of the PCD 100 may also create an association with the predetermined order of payment methods for particular merchants. This means that an operator of a PCD 100 may have a first sequence of payment methods for a first merchant and a second different sequence of payment methods for a second merchant that are stored in a client profile of the PCD payment platform 50.

The PCD payment platform 50 via a tender steering module 744 (See FIG. 7A) may also display payment options 218A. These payment options 218A may provide the operator of the PCD 100 with additional benefits such as credit cards affiliated with a current merchant which may award more loyalty points if the affiliated credit card is used for a purchase.

In other exemplary embodiments, the PCD payment platform 50 via the tender steering module 744 as described below in connection with FIG. 7A may allow the merchant to control the payment options 218A that are presented to the operator of the PCD 100. In this way, the merchant may be provided with a form of payment steering—an indirect control of how an operator of a PCD 100 may decide on how to pay for a products/services 44 through the intelligence provided by the tender steering module 744.

The operator of the PCD 100 may also select one or more different payment methods to pay the total final amount due for a particular purchase which are displayed on the PCD 100. So, for example, an operator may select a credit card to pay a portion of the final bill along with payment from a stored value card and payment from a debit card. According to one exemplary aspect of the invention, the current balances of stored value accounts as well as remaining credit on credit card accounts may be displayed in conjunction with the payment options 218A that are available for selection by the operator with the PCD 100 as illustrated in FIG. 2G.

According to another exemplary feature of the system 101, credit card issuers as well as debit card issuers and stored value account issuers do not need to send any physical tokens to an operator of the PCD 100 when new account numbers may be assigned to a particular operator of the PCD 100. Instead of mailing physical tokens bearing the new account numbers, the issuers of the new account numbers may update the data a storage device or the secure vault 13. A corresponding message may be transmitted from the PCD payment platform 50 to the operator of the PCD 100 when new account numbers have been stored in the secure vault 13 or a storage device in place of old account numbers.

FIG. 2H is a diagram of a screen 202H that shows an electronic receipt 220A that may be provided upon completion of a transaction with a merchant. The electronic receipt 220A may comprise a product listing as well as the total price paid for the products/services 44 which were purchased. The payment method(s) selected by the operator (though not illustrated) may also be displayed on the electronic receipt 220A.

FIG. 2I is a diagram of an exemplary machine-readable tag 124 that may be coupled to an electronic cash register 126 of a merchant that is part of a check-out system 90B. The machine-readable tag 124 may comprise a machine-readable code 222 which may be scanned with a camera 848 of the PCD 100. The payment application 113 running on the PCD 100 may be able to process the scanned machine-readable code 222.

As noted above, the machine-readable code 222 may comprise either a one dimensional or two-dimensional barcode. Further, other machine-readable codes are included within the scope of the invention and may include contactless technologies, such as near-field communications (NFC) which may or may not be linked to a secure-element, and RFID cards as understood by one of ordinary skill in the art. For these contactless technologies, the tag 124 may comprise an antenna 224 coupled to an integrated-circuit chip (not illustrated).

For check-out scenarios with system 90B, the tag 124 may provide a unique identifier associated with the electronic cash register 126 and a unique identifier associated with a merchant that operates the electronic cash register 126. These unique identifiers may be contained within the machine-readable code and/or associated with the code. The tag 124 may also comprise a human-readable code 223 that may be keyed-in by the operator of the PCD 100 instead of scanning the machine-readable code 222 with the PCD 100.

Figure 3A:
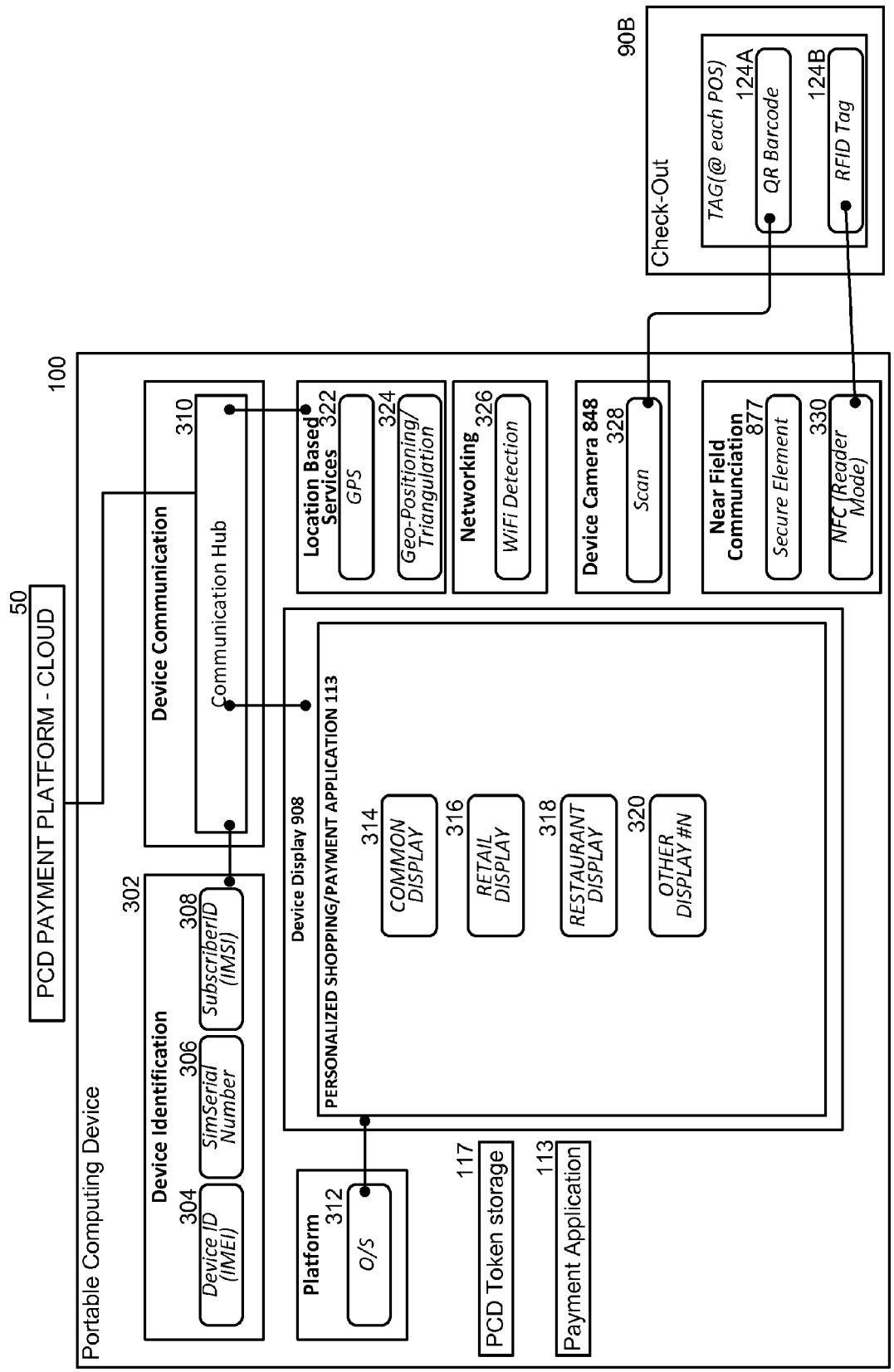
FIG. 3A is a diagram of hardware components and software components running on a portable computing device for supporting transactions with the portable computing device.

FIG. 3A is a diagram of hardware components and software components running on a portable computing device 100 for supporting transactions with the portable computing device 100. The components may include a device identification module 302, a communication hub module 310, an operating system platform ("O/S") module 312, a global positioning satellite ("GPS") module 322, a geo-positioning/triangulation module 324, a WiFi detector module 326, a scan module 328, a secure element module 877, and a near field communication module 330.

One of the software components may include the payment application 113. The payment application 113 may further comprise additional modules for rendering visuals on the device display 908. These additional modules may include, but are not limited to, a common display module 314, a retail display module 316, a restaurant display module 318, and other display modules #N 320. Further details about the additional modules that are part of the payment application 113 will be described below in connection with FIG. 3B. The PCD 100 may also comprise PCD token storage 177. PCD token storage 117 may contain PCD tokens generated by module 77 of the PCD payment platform 50. PCD token storage 177 may comprise hardware and/or software.

The device identification module 302 may also comprise submodules such as a device identifier or International Mobile Equipment Identity ("IMEI") module 304, a subscriber identity module ("SIM") serial number module 306, and/or a subscriber identifier module or international mobile subscriber identity ("IMSI") module 308. Usually, a portable computing device 100 would usually have only one of these modules to uniquely identify the portable computing device 100 to the communications network 142 and the PCD payment platform 50 as understood by one of ordinary skill in the art.

The communication hub module 310 is responsible for relaying information between the device identification module 302 and the PCD payment platform 50 as well as between the GPS module 322 and the PCD payment platform 50. The communication hub module 310 may support conventional mobile phone communication protocols as understood by one of ordinary skill in the art.

The GPS module 322 and geo-positioning/triangulation module 324 may assist the PCD payment platform 50 with determining the physical location of the portable computing device 100. Once the PCD payment platform 50 is aware of the physical location of the portable computing device 100, the PCD payment platform 50 may determine in which merchant location the portable computing device 100 is located.

The WiFi detector module 326 may communicate with a WiFi local area network ("LAN") router 142A. The Wifi LAN router 142A may allow an operator of the portable computing device 100 to alert the PCD payment platform 50 when the portable computing device has entered into the location of a merchant. In this way, the PCD payment platform 50 may be able to provide unique offers to the operator of the portable computing device 100 before the operator decides to complete a transaction for products/services 44.

The check-out system 90B may also comprise machine-readable tags 124 that are positioned at each point-of-sale terminal or electronic cash register ("ECR") 126. Each machine-readable tag 124 of the check-out system 90B, like the check-in system 90A, may comprise a 2-D QR barcode 124A and/or an RFID tag 124B.

The scan module 328 may work in conjunction with the camera 848 of the portable computing device 100. The scan module 328 may process scans of the 2-D QR barcodes that are present on respective machine-readable tags 124. Similarly, the secure element module 877 and NFC module 330 may work with RFID tag 124B that may be part of either the check-in system 90A or the check-out system 90B. The O/S module 312 may comprise any one of conventional mobile phone operating systems known as of this writing. For example, the O/S module 312 may comprise an android operating system, an iPhone operating system, a Java 2 Platform Micro Edition ("J2ME") operating system, a Research-In-Motion ("RIM") operating system, and a Binary Runtime Environment for Wireless ("BREW") MP operating system as understood by one of ordinary skill in the art.

Figure 3B:
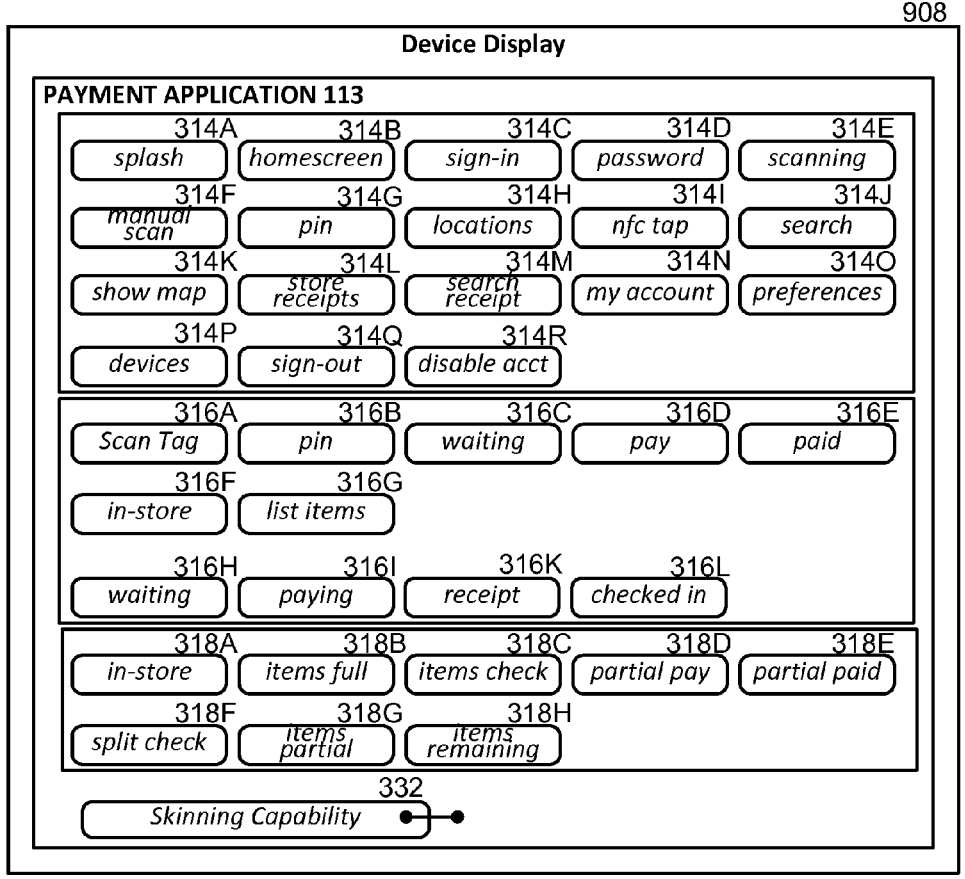
FIG. 3B is a diagram of several software components for a payment application running on a portable computing device.

FIG. 3B is a diagram of several software components for a payment application 113 running on a portable computing device 100. The software components may form the common display module 314, the retail display module 316, and the restaurant display module 318 of FIG. 3A. The software components for the common display module 314 may include, but are not limited to: a splash module 314A, a home screen module 314B, a sign-in module 314C, a password module 314D, a scanning module 314E, a manual scan module 314F, a personal identification number ("PIN") module 314G, a locations module 314H, an NFC tap module 314I, a search module 314J, a show map module 314K, a store receipts module 314L, a search receipt module 314M, a "my account" module 314N, a preferences module 314O a devices module 314P, a sign-account module 314Q, and a disable account module 314R as understood by one of ordinary skill in the art.

In this example, the splash module 314A performs the user and device authentication check on the display 808, such as a touch screen display, of the PCD 100. The home screen module 314B allows the operator to return to a home screen or default screen for the PCD 100. The sign-in module 314C allows manages any credentials that the operator enters into the PCD 100. The password module 314D reviews any received credentials for a match with the password selected by the operator. The scanning module 314E activates an automatic scanning feature supported by the PCD 100 so that the camera may automatically focus the camera for 848 for reading a tag 124. The manual scan module 314F activates a manual scanning feature in which the operator may control the focus of the camera 848 for reading a tag 124.

The personal identification number ("PIN") module 314G allows the operator to change his or her PIN as understood by one of ordinary skill in the art. The locations module 314H supports a function in which the PCD 100 may display the closest merchants who support the PCD payment features. The NFC tap module 314I allows an operator to activate NFC functionality of the PCD 100. The search module 314J allows an operator to search for specific transactions that were made using the PCD 100. The show map module 314K may support functions such as a geographical map relative to the location of the PCD 100 as well as maps of building plans for merchants who support payments with the PCD 100.

The store receipts module 314L allows an operator to pull up copies of electronics receipts for any transaction completed by the PCD 100. The search receipt module 314M allows the operator to search for specific electronic receipts that were generated by the PCD 100. The "my account" module 314N allows an operator to review the current balances and pending payments supported by the PCD 100 for transactions completed with the PCD 100. The preferences module 314O allows an operator to display preferences for the account associated with the PCD 100, such as allowing the operator to select a preferred sequence of payment accounts to use with the PCD 100 for a transaction.

In some embodiments, the preferences module 314O of FIG. 3B may allow the operator of the portable computing device 100 to preconfigure the sequence or order of payment accounts that are displayed by the portable computing device 100. This preconfiguration impacts when the operator is ready to make a payment using the portable computing device 100. This preconfiguration of sequence or order of payment accounts may be a setting that cannot be overridden by the merchant via the tender steering module 744. In other words, this preconfiguration setting or option supported by the preferences module 314O of the PCD 100 may deactivate or disable some or all of the functions of the tender steering module 744 which is described below in connection with FIG. 7A.

This preconfiguration may also allow the operator of the PCD 100 to make a purchase with a one touch or single touch action instead of multiple actions to scroll through available payment account options. However, if an operator does not set up this preconfiguration, a default setting of the portable computing device 100 may allow the sequence or order of payment accounts to be controlled by the merchant as described below in connection with the tender steering module, which is a focus of FIG. 7A.

The devices module 314P allows an operator to review the multiple PCDs 100 that may be used by the operator to complete transactions. For example, if the operator had a plurality of mobile phones, then the devices module 314P may display a listing of the mobile phones associated with use of the mobile payment account. The sign-account module 314Q may allow operator to enter his or her electronic signature for completing transactions such as ACH transactions which may require an electronic signature. The disable account module 314R may support a function in which an operator may turn off his or her mobile payment account so that unauthorized use may not occur with other PCDs 100 that may be associated with the account.

The software components for the retail display module 316 may include, but are not limited to: a scan tag module 316A, a PIN module 316B, a first waiting module 316C, pay module 316D, a paid module 316E, and in-store module 316F, a list items module 316G, a second waiting module 316H, a paying module 316I, a paid module 316J, a receipt module 316K, and a check-in module 316L as understood by one of ordinary skill in the art.

The scan tag module 316A may automatically activate the camera 848 for focusing on a tag 124. The PIN module 316B may allow operator to change his or her PIN that may be associated only with retail transactions. The first waiting module 316C may activate a timer that an operator may select when he or she is waiting for the ECR 412 to communicate with the PCD payment platform 50. The pay module 316D may allow the operator to automatically pay a balance when the balance is displayed by the PCD 100. The paid module 316E notifies the operator of the authorization or decline of each form of payment previously selected as well as the overall success or decline of the full transaction.

The in-store module 316F may allow the operator to indicate that he or she is present within the store of a merchant prior to checking-in or checking-out using a tag 124. The list items module 316G may allow operator to redisplay any items being checked out for a payment transaction associated with the PCD 100. A second waiting module 316H may be activated by an operator of the PCD 100 when he or she is waiting for their payment options after a total bill for the transaction has been displayed. The paying module 316I, which works with the tender steering module 744 of FIG. 7A, may display the amount due along with a selection of applicable tender/payment methods previously loaded to the PCD payment platform 50.

The operator of the PCD is given the opportunity to select one or more methods of payment to satisfy the amount due. The receipt module 316K allows an operator display the electronic receipt associated with the last transaction or the current transaction being processed by the PCD 100. The check-in module 316L may be activated by the operator when she or he is about to use the check-in system 90A of FIG. 1A.

The software components for the restaurant display module 318 may include, but are not limited to: an in-store module 318A, an items full module 318B, an items check module 318C, a partial pay module 318D, a partial paid module 318E, a split check module 318F, an items partial module 318G, and an items remaining module 318H as understood by one of ordinary skill in art.

The in-store module 318A may allow operator to alert the PCD payment platform 50 that the PCD 100 is present within a restaurant. The items full module 318B displays the full list of items scanned in or otherwise entered by the "sales associate". The items check module 318C allows an operator of the PCD 100 start a payment process associated with a restaurant transaction so that the operator does not need to wait for a waiter or waitress.

The partial pay module 318D allows the operator of the PCD 100 to pay with the PCD 100 in addition to another form of payment not supported by the PCD 100 such as by a physical token like a credit card carried by the operator of the PCD 100. In the case where multiple parties each identify themselves as payors of the full amount due, the partial paid module 318E notifies the each operator of the approval or decline of their portion of the entire amount due.

The split check module 318F allows an operator to split a check with another person who may be dining with the operator of the PCD 100. The items partial module 318G displays only the items that have been identified by the operator of the PCD as his/her portion of the full bill. The items remaining module 318H displays all items and remaining amount due that has not yet been satisfied during a split check.

The skinning capability module 332 provides a function for enabling a third party to utilize the full functionality of the system but with the look-n-feel of their choosing.

FIG. 4 is a diagram illustrating details for the merchant point-of-sale ("POS") system 12 and the merchant enterprise system 16 of FIG. 1 for completing a sales transaction with a portable computing device 100. The merchant POS system 12 may comprise a store controller 410 and an electronic cash register ("ECR") 412. The ECR 412 may comprise a drawer for storing cash currency. The ECR 412 may also print a receipt 127 for a customer with a printing device, like a printer (not illustrated).

The ECR 412 may be coupled to a handheld (or fixed) scanner 132 which may be used to scan other machine-readable labels attached to one or more products/services 44. The scanner 132 may comprise a bar code reader or any type of similar device used to collect information from machine-readable labels attached to products/services 44.

The ECR 412 may also be coupled to a reader (or terminal) 128, such as a mag-stripe reader or other such device for reading any one of a number of tokens 123 such as credit cards, debit cards, loyalty cards, stored value cards such as gift cards, and the like.

For example, the reader 128 may comprise a device that reads magnetic stripes on cards, integrated circuit cards, and near-field-communication (NFC) cards as understood by one of ordinary skill in the art. The reader 128 may be coupled with a keypad 129 so that a consumer may enter appropriate information relative to any token that may be scanned or read by the reader 128.

The ECR 412 is also coupled to the store controller 410. The store controller 410 may support one or more electronic cash registers (ECRs) 126 for a particular location of a merchant. The store controller 410, as understood by one of ordinary skill in the art, may comprise a computer server for tracking and matching scanned product codes with a product inventory database (not illustrated separately) which is maintained by the store controller 410.

The store controller 410 may receive product data that is produced by the product scanner 132 and which is relayed by the ECR 412. The store controller 410 may be responsible for securing authorization for payment from a consumer after a token is read by the POS terminal 128B. The store controller 410 may support one or more product specific languages as understood by one of ordinary skill in the art such as, but not limited to, unified POS and JAVA™ POS.

To secure authorization for payment, such as for a credit or debit card, the store controller 410 communicates the merchant enterprise system 16 via the communications network 142. The merchant enterprise system 16 may comprise an Ewallet system 402, a credit switch 404, a data update module 406, and an enterprise router 408.

As illustrated in FIG. 4, the store controller 410 communicates with the enterprise router 408 of the merchant enterprise system 16. The router 408 may comprise a device that interconnects two or more computer networks, and selectively interchanges packets of data between them, as is understood by one of ordinary skill in the art.

The router 408 of FIG. 4 couples the store controller 410 to credit card system 20A, the vault 13, and merchant acquirer 10 for traditional payment processing. The router 408 of FIG. 4 also couples the store controller 410 to alternative payment systems 18. Traditional payment processing may include, but is not limited to, processing payments from accounts associated with traditional credit cards and debit cards. The credit card system 20A may comprise exemplary networks such as the VISA™ credit card network, the MASTERCARD™ card network, the DISCOVER™ credit card network, the AMERICAN EXPRESS™ credit card network, and other similar charge or debit card proprietary networks.

Meanwhile, the alternative payment systems 18 may be responsible for handling and managing non-traditional or alternative payment processing. For example, alternative payment processing may include, but is not limited to, processing payments from accounts associated with certain online financial institutions or other service providers, like PAYPAL™, BILL ME LATER™, Wii™, APPLE™, GREEN DOT™, and mobile phone carriers like SPRINT™ and VERIZON™.

The eWallet system 402 may provide information and support functions for one or more stored value accounts as well as other types of accounts, such as, but not limited to, credit card accounts and bank accounts, as understood by one of ordinary skill in the art. The data update module 406 may allow the merchant enterprise system 162 update its records for any new mobile payment accounts that were used by consumers to pay for transactions.

The electronic cash register ("ECR") 412 may comprise a plurality of components. These components may include hardware and software modules. Exemplary components include, but are not limited to, a loyalty module 414, a credit module 416, a private-label module 418, a coupons/discounts module 420, a PIN/debit module 422, a check module 424, an item entry module 426, a gift module 428, a cash module 430, and a mobile payment module 432. The aforementioned components may be selected by an operator of the ECR 412 in order to complete payment for a transaction.

The ECR 412 may be coupled to a product scanner 132 for scanning one-dimensional and two-dimensional barcode labels. The ECR for 12 may also be coupled to a reader 128 that may comprise a magstripe and/or an NFC reader. The ECR 412 may also be coupled to a PIN pad 129 as well as a receipt printer 134 for printing a receipt 127, a sale total monitor 133, and a graphical customer display 131 that may list one items purchased during a transaction.

Figure 5:
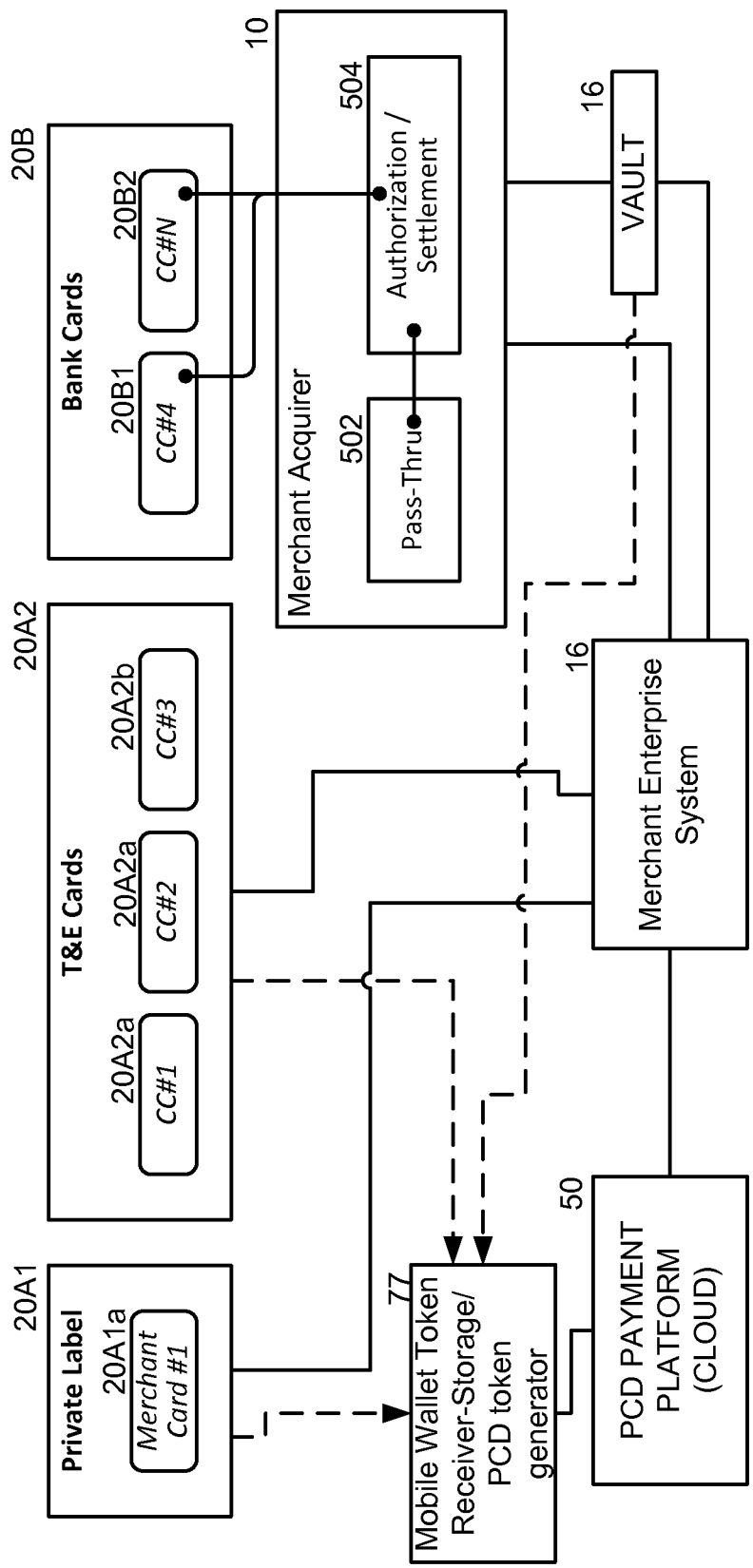
FIG. 5 is a diagram illustrating details of a merchant acquirer and credit card subsystems of FIG. 1 for completing a sales transaction.

FIG. 5 is a diagram illustrating details of a merchant acquirer 10, vault 13, bank card systems 20B, and credit card systems 20A of FIG. 1 for completing a sales transaction. Account issuing entities, such as the vault 13, bank card systems 20B, and credit cards systems 20A may be coupled to the mobile wallet token receiver-storage/PCD token generator module 77. As explained above in connection with FIG. 1, each of these account issuing entities may issue mobile wallet tokens that are sent to and stored in module 77. These mobile wallet tokens are transmitted by module 77 back to account issuing entities when a PCD user desires to pay a transaction with his or her PCD 100.

The merchant acquirer 10 may comprise a pass-through module 502 and an authorization/settlement module 504. The pass-through module 502 may pass request for payment authorization information directly to a selected bank card system 20B. Meanwhile, the authorization/settlement module 504 may perform some authentication prior to sending request for payment authorization onto a bank card system 20B.

The merchant acquirer 10 usually supports credit card systems that are provided by financial institutions such as banks. For example, credit card 20B1 may comprise a first bank card like a CHASE™ card from CHASE™ bank while credit card 20B2 may comprise a second bank card like a bank card from the BANK OF AMERICA™ lender. These institutions usually offer their brand of VISA™ and MASTERCARD™ type cards.

Other credit card systems 20A may comprise private-label cards 20A1 as well as traditional travel and entertainment cards 20A2. Private-label cards may include, but are not limited to, merchant based cards 20A1a such as those for specific retail establishments like, THE HOME DEPOT™, WALMART™, NORDSTROM™, SAKS™, etc. Traditional travel and entertainment cards 20A2 may include, but are not limited to, DINERS CLUB CARD™, AMERICAN EXPRESS™, and DISCOVER™.

While a direct connection is illustrated between the merchant enterprise system 16 and the credit card systems 20A as well as the merchant acquirer 10, one of ordinary skill in the art recognizes that such a connection may be a virtual one which is supported by the communications network 142. Similarly, a direct connection is illustrated between the merchant enterprise system 16 and the PCD payment platform 50. This direct connection may also comprise a virtual one supported by the communications network 142 as illustrated in FIG. 1.

Figure 6:
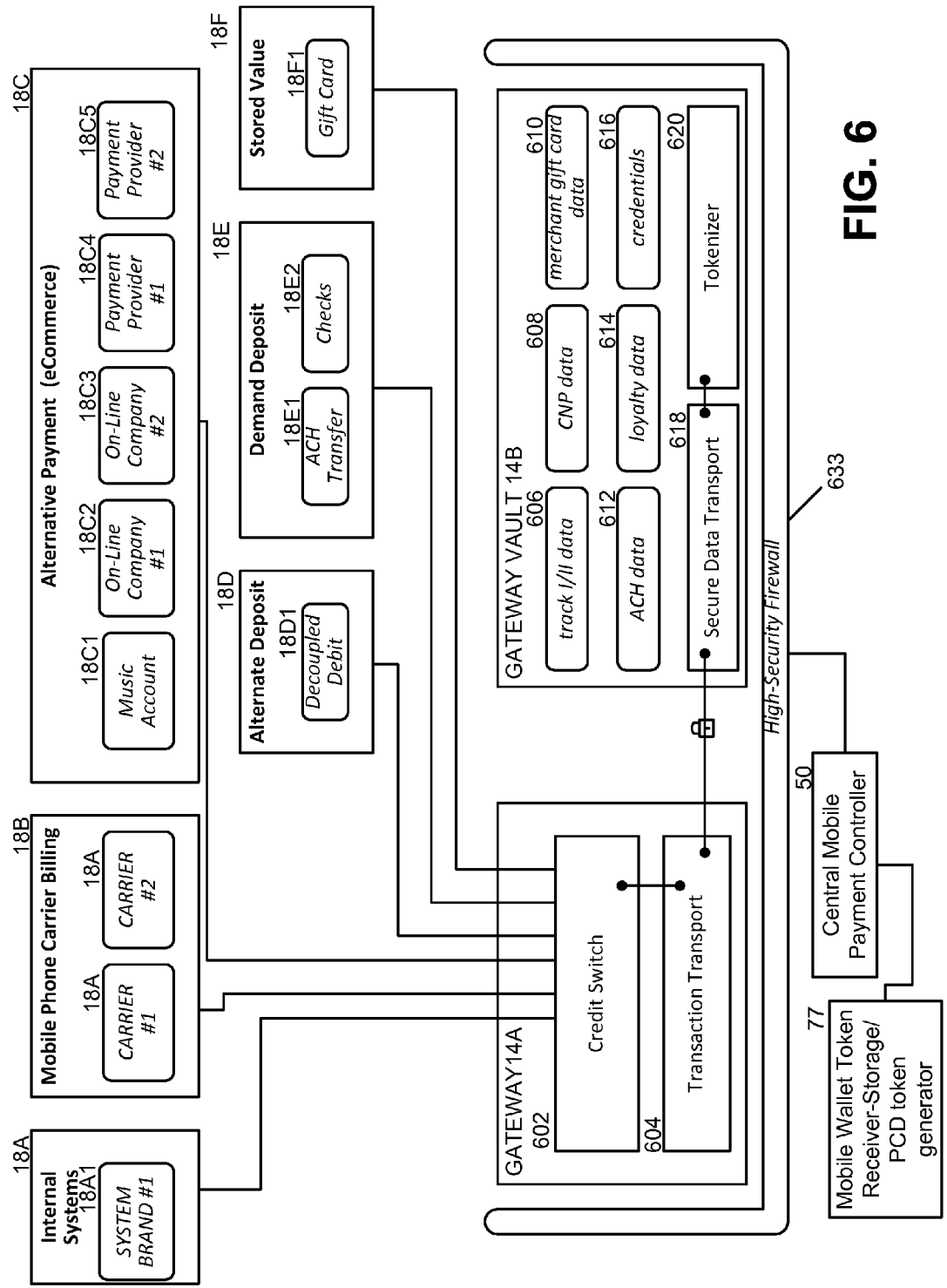
FIG. 6 is a diagram illustrating details of a gateway and alternative payment systems illustrated in FIG. 1.

FIG. 6 is a diagram illustrating details of a gateway 14 and alternative payment systems 18 illustrated in FIG. 1. The gateway 14 may comprise a traditional gateway module 14A, a gateway vault 14B, and a high-security firewall 633. The high-security firewall 633 provides a secure communication channel between the PCD payment platform 50 and the gateway 14. A traditional gateway module 14A may comprise a credit switch 602 and a transaction transport module 604.

The traditional gateway module 14A may comprise a payment server as understood by one of ordinary skill in the art. Communications between the PCD payment platform 50 and the gateway 14 may comprise a secured socket layer (SSL) encrypted connection and may pass through the high-security firewall 633 as understood by one of ordinary skill in the art. Usually, the PCD payment platform 50 issue commands to the gateway vault 14B to relay account information to the gateway module 14A. The payment gateway module 14A may forward the transaction information to one of the alternative payment systems 18 via the credit switch 602.

Specifically, the credit switch 602 may be responsible for exchanging data with each of the different alternative payment systems 18 illustrated in FIG. 6. The transaction transport module 604 may be responsible for exchanging data with a secure data transport module 618 of the gateway vault 14B.

The gateway vault 14B may comprise track 1/track two data 606, card not present ("CNP") data 608, merchant gift card data 610, automated clearinghouse ("ACH") data 612, loyalty data 614, and credentials 616. The gateway vault 14B may also comprise a tokenizer 620. The tokenizer 620 may receive a payment authorization request from the PCD payment platform 50 in format according to specific industry rules based on the payment accounts stored with or associated with the gateway vault 14B.

The alternative payment systems 18 may comprise various different methods of payment available to the operator of the portable computing device 100 for completing a transaction. The alternative payment systems 18 may comprise internal systems 18A, mobile phone carrier billing 18B, e-commerce vendors 18C, alternate deposit systems 18D, demand deposit schemes 18E, and stored value systems 18F.

These systems 18 may also be characterized or described as account issuing entities. These account issuing entities may also generate mobile wallet tokens which are transmitted to the mobile wallet token-receiver/PCD token generator module 77 via the PCD payment platform 50. The systems 18 may issue mobile wallet tokens if an account holder requests use of an account with his or her PCD 100 by selecting one or more options via an account management page such as illustrated in FIG. 7C described below.

An internal system 18A may comprise accounts from an Ewallet system for the portable computing device 100, such as SWAGG™ brand of mobile payments offered by Outlier (a subsidiary of QUALCOMM, Incorporated). Mobile phone carrier billing systems 18B may include, but are not limited to, accounts from wireless carriers as of this writing such as, SPRINT™ accounts, AT&T™ accounts, VERIZON™ accounts, etc. E-commerce vendors 18C may include, but are not limited to, accounts from e-commerce vendors like iTUNES™ accounts, GOOGLE™ check out accounts, AMAZON™ payments, BILLMELATER™ accounts, and PAYPAL™ accounts. Alternate deposit systems 18D may include be coupled debit systems 18D1 and the like. Demand deposit systems 18E may include ACH transfers 18E1 and checks 18E2. And stored value systems 18F may include gift cards 18F1 offered by a merchant.

Figure 7A:
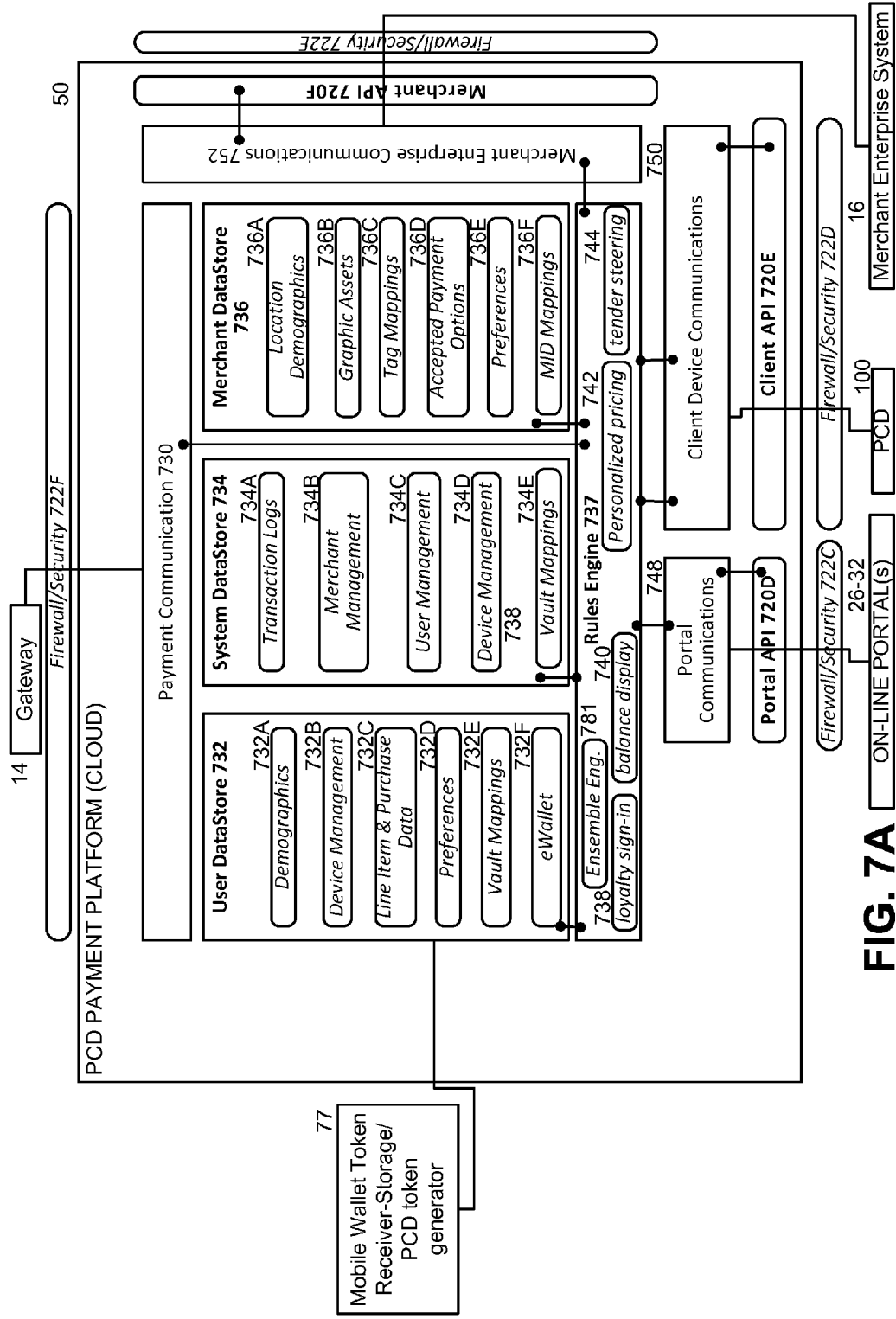
FIG. 7A is diagram illustrating details for the central mobile payment controller illustrated in FIG. 1 that assists with providing personalized pricing and ensemble suggestions for the PCD consumer.

FIG. 7A is diagram illustrating details for the PCD payment platform 50 illustrated in FIG. 1. The PCD payment platform 50 manages data between the PCD 100 and the merchant enterprise system 16. The PCD payment platform 50 may support industry standard compliance measures. For example, the PCD payment platform 50 may be compliant with Payment Card Industry ("PCI") standards. In this way, the merchant enterprise system 16 and the PCD 100 do not store any sensitive data such as credit card information and personal information like social security numbers, home addresses, etc. Such sensitive data may be stored in the PCD payment platform 50.

The PCD payment platform 50 is also responsible for communicating with a gateway 14 for establishing a connection with alternative payment systems 18. The PCD payment platform 50 may also relay product scan data sent from the merchant enterprise system 16 over the communications network 142 to the PCD 100. In this way, the PCD 100 may display products individually (merchandise/service stock keeping unit—"SKU") on the display of the PCD 100 as they are scanned in by the product scanner 132 of the merchant POS system 12. The PCD payment platform 50 may also relay identification (loyalty), promotions (offers/discounts), and payment information between the PCD 100 and merchant POS system 12 as described in further detail below.

The PCD payment platform 50 may comprise a payment communication module 730, a user data store module 732, a system datastore module 734, a merchant data store module 736, a rules engine 737, an advertising API 720B, an advertising transport module 728, a loyalty API 720C, a loyalty transport module 746, a portal API 720D, a portal communications module 748, a client API 720E, a client device communications module 750, a merchant API 720F, and a merchant enterprise communications module 752.

The payment communications module 730 may support the communications between the PCD payment platform 50 and the gateway 14 that is coupled to the alternative payment systems 18. While a direct connection between the PCD payment platform 50 and the gateway 14 is illustrated, one of ordinary skill in the art recognizes that this direct connection may be a virtual one using the communications network 142 of FIG. 1. The user data store module 732 may comprise a plurality of submodules that include, but are not limited to, a demographics submodule 732A, a device management module 732B, a line item and purchase data module 732C, a preferences module 732D, a vault mappings module 732E, and an Ewallet module 732F.

The demographics submodule 732A may track preferences of the operator of the PCD 100 as well as characterizations made by the PCD 100 about the possible race, age, and gender of the operator. The device management module 732B may support functions for associating multiple PCDs 100 with the mobile payment accounts of a single operator. The line item and purchase data module 732C may track all purchases made with the portable computing device 100. The preferences module 732D may store and support any new preferences requested by the operator using a PCD 100. The vault mappings module 732E may support request for payments from payment accounts associated with the gateway vault 14B of FIG. 1. An Ewallet module 732F supports request for managing in a walled account associated with a particular PCD 100.

The system datastore module 734 may comprise a plurality of submodules that include, but are not limited to, a transaction log module 734A, a merchant management module 734B, a user management module 734C, a device management module 734D, and a vault mappings module 734E.

The transaction log module 734A may automatically record and store the line items associated with each transaction paid with the portable computing device 100. The merchant management module 734B may automatically record and store the various merchants which received payment from the portable computing device 100.

The user management module 734C may allow the operator of the PCD 100 to manage various functions and options that are selectable for a given mobile count. The device management module 734D may support functions for associating multiple PCDs 100 with the mobile payment accounts of a single operator. The vault mappings module 734E may support request for payments from payment accounts associated with the gateway vault 14B of FIG. 1.

Similarly, the merchant data store module 736 may comprise a plurality of submodules that include, but are not limited to, a location demographics module 736A, a graphic assets module 736B, tag mappings module 736C, and accepted payment options module 736D, a preferences module 736E, and MID mappings module 736F.

The location demographics module 736A may track the various merchant locations that are receiving payments with the PCD 100 for completing transactions. The graphic assets module 736B may support the various graphical elements such as artwork and icons associated with the credit cards. The tag mappings module 736C may store the various specific tags 124 that may be scanned with the PCD 100.

The accepted payment options module 736D may control the listing of payment options that are displayed on the PCD 100 when a final amount is listed as due for a transaction. The preferences module 736E may store various preferences from merchants such as payment types and costs associated with each payment type that may be selected by an operator of a PCD 100. The merchant ID ("MID") mappings module 736F associates the system's single "enterprise" relationship to each of the merchant's individual store locations.

The rules engine 737 may also comprise a plurality of modules. Exemplary modules include, but are not limited to, a loyalty sign-in module 738, a balance display module 740, the personalized pricing module 742, a tender steering module 744, and a product ensemble engine 781. The loyalty sign-in module 738 may be responsible for automatically retrieving loyalty data associated with the portable computing device 100. The balance display module 740 may be responsible for sending the data to the display 808 of the portable computing device 100. Such data may include product scan data received from the merchant enterprise system 16 as well as the final total do for products/services 44 that are to be purchased using the portable computing device 100.

The personalized pricing module 742 may be responsible for automatically retrieving offers and coupons from an offer/coupon system (not illustrated) based on the current location of the portable computing device as well as any products/services 44 that have been scanned in for purchase by the PCD user and/or the merchant POS system 12. The offer/coupon system may include a third party offer generators, a consumer package goods ("CPG") module, and a manufacturer's module.

The rules engine 737 working in conjunction with the personalized pricing module 742 may provide the unique and customized or "personalized" pricing for products and/or services displayed by the payment application 113. The rules engine 737 may comprise software or hardware or both.

The product/service ensemble engine 781 may suggest additional products and/or services that may be related to products/services 44 that have been scanned-in by the PCD consumer and/or those that are maintained in a wishlist for the PCD consumer. Similar to the personalized pricing module 742, while the product/service ensemble engine 781 has been illustrated in FIG. 7A to be part of the rules engine 737, one of ordinary skill in the art will recognize that the rules engine 737 could be designed to be part of the product/service ensemble engine 781. Alternatively, the product/service ensemble engine may be completely separate from the rules engine 737 so that two processing entities exist.

The tender steering module 744 may be responsible for automatically displaying the options for paying for a particular transaction. The options would include those associated with the alternative payment systems 18 as well as the traditional payment systems 20 that are associated with the operator of the portable computing device 100.

Specifically, with the tender steering module 744 of FIG. 7A working with the paying module 316I of FIG. 3B, a merchant is provided with the ability to arrange payment accounts in a predetermined order or a predetermined sequence so that they are displayed to an operator of a portable computing device 100 so that the merchant may steer or influence the operator of a portable computing device 100 towards one or more payment accounts favored or desired by the merchant.

These payment accounts may be presented in the predetermined order or sequence once the tender steering module 744 receives a signal that indicates the consumer/operator is ready to make a payment on his or her purchase with the portable computing device 100. These payment accounts may include merchant branded or otherwise known as private brand payment accounts which may permit a merchant to collect a rebate on the purchase made by the consumer/operator. Such rebates are usually percentage based and are usually on the order of about 5% of a purchase made by consumer as understood by one of ordinary skill in the art. Other payment accounts may include those accounts in which the merchant may pay a lower interchange rate for processing payments for a transaction. Other accounts that may lower interchange rates for merchants may include stored value accounts like merchant branded gift card accounts.

The tender steering module 744 may promote the use of partial payment with gift cards that do not have value equal to the purchase price. The operator may then select from the portable computing device 100 another form of payment account in addition to the stored value account if the stored value account does not have sufficient value to cover the entire purchase price. In this way, merchants may ensure that low value gift cards are utilized by the consumer so that the merchant may clear out gift card accounts. When merchants clear out gift card accounts, then this may substantially minimize account reporting services required for gift card accounts, especially for low value gift card accounts (such as those under a value on the order of $10 where the cost of the reporting service may approach or exceed the amount of the value maintained in the stored value account).

The system 101 through the tender steering module 744 may order or sequence the payment accounts on a portable computing device 100 in such a fashion so that the most desirable or favored payment accounts by the merchant are presented first to the consumer while the least favored or less desirable payment accounts are pushed or placed at the very end of a list for display on the portable computing device 100. Accounts presented at the end of the list may require additional scrolling effort for the consumer to reach by utilizing a series of sequenced displays as understood by one of ordinary skill in the art.

For example, if the consumer had a merchant branded gift card account, a merchant branded credit card account, and a non-merchant branded credit card account, then the system may allow the merchant to present the merchant branded gift card account first, the merchant branded credit card account second, and the non-merchant branded credit card account third—assuming that this ranking or listing of payment accounts favors the merchant in which the least expensive is displayed first while the most expensive is displayed last relative to the transaction costs which may be assessed against the merchant. This ranking of payment accounts may also prove beneficial for those non-merchant branded credit card accounts, such as rewards cards, which may have a significantly higher amount of fees that are charged to the merchant and may be used by the consumer.

The system 101 via the tender steering module 744 may also support an intelligence in which payment accounts are presented in a sequence on the PCD 100 that is determined by the actual purchase price for the transaction. For example, the consumer may have a debit card payment account as well as a gift card account. Certain fixed transactional fees may apply to the debit card account while no fees or a percentage of fees may apply to the gift card account. If transaction fees which apply to the debit card account far exceed the percentage of fees corresponding to the gift card, then the system 101 via the tender steering module 744 may select the gift card as the first option to present to the consumer for completing a transaction for the benefit of the merchant.

For example, if a consumer's final purchase price is $1.03 and his debit card charges a fixed fee of $0.50 per transaction to the merchant while the gift card account may only charge 5% of the transaction to the merchant, then the tender steering module 744 may strongly favor or present the gift card as the top choice for the consumer on the portable computing device instead of the higher fee debit card relative to the final purchase price.

In addition to presenting or sequencing the payment accounts for display on a portable computing device 100 in such a fashion so that the most desirable or favored by the merchant are presented first to the consumer while the least favored or less desirable payment accounts are pushed or placed at the very end of a list, the system 101 via the tender steering module 101 will enable merchants to promote or supply additional offers in order to steer or influence consumers towards a payment account desired by a merchant.

For example, the merchant may provide personalized and unique offers to consumers on the PCD 100 after the system 101 via the tender steering module 744 looks-up the consumer's history with the merchant or on other transactions. These personalized and unique offers may be presented adjacent to the payment accounts on the PCD 100 desired by the merchant for the consumer to use to complete a transaction. A merchant may present a reward, like a certain percentage discount, on the PCD 100 in order to persuade a consumer to use a payment account desired by the merchant. These personalized and unique offers may be random in nature or presented in sequences depending on the frequency of use or frequency of transactions completed by the consumer with a merchant.

The merchant may set up certain business rules with the tender steering module 744 in order to control the development of the personalized and unique offers presented to each consumer on his or her PCD 100. For example, the merchant may set up a rule that if a transaction is greater than a predetermined amount of money, then the tender steering module 744 via the pay modules 316D and/or 316I may present a certain desired payment account coupled with a percentage discount on the transaction to the consumer.

As another example, the merchant may set up a rule in the tender steering module 744 that reviews the loyalty program participation of the consumer and what the history of the consumer has been in the program. If the consumer has reached a certain number of visits and/or transaction volume (like money spent and/or or number of items) with the merchant, then the tender steering module 744 may offer a unique and personalized discount that could include a percentage discount on the transaction for the consumer if they use a specific payment account, like a merchant branded payment account. This allows the merchant to influence the payment account selection habits of the consumer since the consumer will likely want to use a payment account that generally may provide occasional discounts beyond other forms of payment accounts.

By looking at the first six digits of payment accounts available to the consumer, the system 101 via the tender steering module 744 may determine a status of the payment account such as its benefits level (i.e. whether the payment account qualifies as a gold level, a platinum level, a diamond level, etc.) and what corresponding interchange rates may apply based on that benefits level. Depending upon what fees will be assessed for the merchant for a particular payment account, the system 101 via the tender steering module 744 may organize or sequence the payment accounts in order from least expensive to most expensive relative to the fees assessed against the merchant for each payment account.

Usually payment accounts with lower status such as regular credit cards without any elite status (like diamond, gold, or platinum levels) will have lower interchange rates because there are fewer benefits provided to the payment account holder. As of this writing, merchants may pay on the order of between about 2.14% to about 5.00% on interchange rates for cards with elite status. Meanwhile, cards without this elite status, especially the merchant branded credit cards or gift cards, will usually be significantly less and, in some instances, the merchant may even receive rebates with their own branded credit card or gift card account.

According to another exemplary aspect, the rules maintained and executed by the tender steering module 744 may determine that the consumer does not have a certain merchant branded payment accounts that would be desirable for the merchant. Since the tender steering module 744 has access to the consumers contact information through a loyalty program, the rules in the tender steering module 744 may allow the merchant to offer the consumer to accept a new payment account starting with the current transaction at hand. If the consumer decides to accept the offer for the new payment account offered by the merchant via the tender steering module 744, then the system 101 via the tender steering module 744 and other modules may run an immediate credit and/or background check to determine if the consumer should be approved for this new payment account. This credit and background check may happen on-the-fly and may be completed within a few minutes upon acceptance by the consumer to take this new merchant branded payment account offered by the merchant through the tender steering module 744.

The client device communications module 750 may support communications between the PCD payment platform 50 and the portable computing device 100. While a direct connection between the PCD payment platform 50 and the portable computing device 100 is illustrated, one of ordinary skill in the art recognizes that this direct connection may be a virtual one using the communications network 142 of FIG. 1. The client device communications module 750 may establish communications with the portable computing device 100 through a client API 720E. Specifically, the client device communications module 750 may establish a persistent communication with the portable computing device 100 that may be characterized as a form of secure chat messaging.

The merchant enterprise communications module 752 may support communications between the PCD payment platform 50 and the merchant enterprise system 16. While a direct connection between the PCD payment platform 50 and the merchant enterprise system 16 is illustrated, one of ordinary skill in the art recognizes that this direct connection may be a virtual one using the communications network 142 of FIG. 1. The merchant enterprise communications module 752 may establish communications with the merchant enterprise system 16 by using a merchant API 720F. A secure communication channel may be established over the communications network 142 between the merchant enterprise communications module 752 and the merchant enterprise system 16 as understood by one of ordinary skill in the art.

All of the inbound and outbound communications for the PCD payment platform 50 may pass through firewall/security layers 722A-F as understood by one of ordinary skill in the art. Each firewall/security layer 722 may comprise a device or set of devices designed to permit or deny network transmissions based upon a set of rules.

Figure 7B:
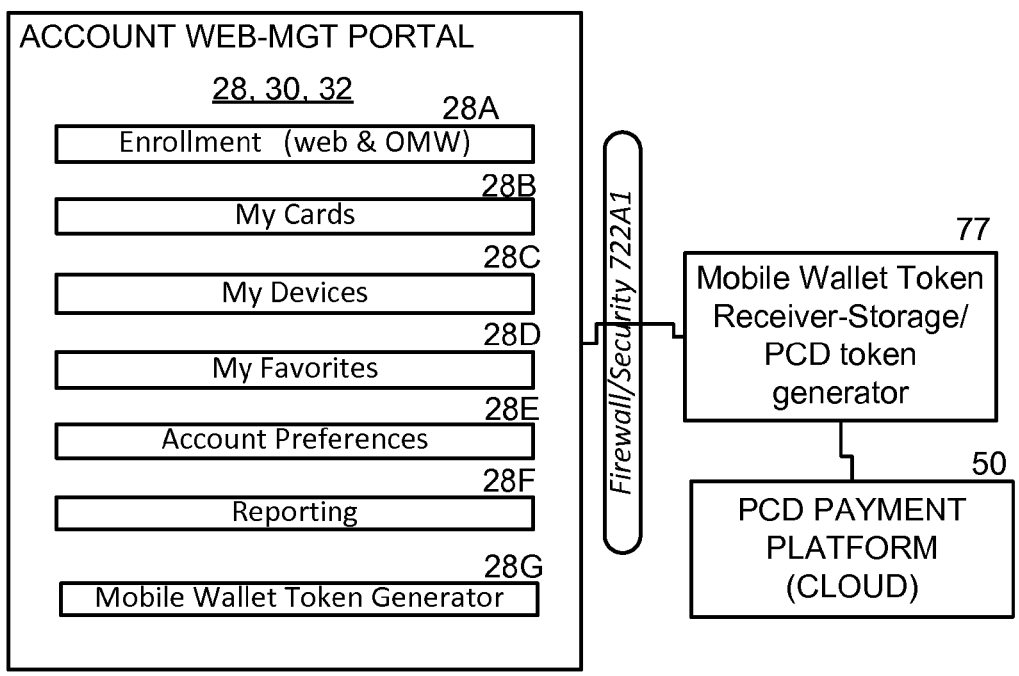
FIG. 7B is a diagram illustrating several on-line portals for managing payment accounts according to one exemplary embodiment of the invention.

FIG. 7B is a diagram illustrating several online portals 28-32 for managing a payment account according to one exemplary embodiment of the invention. The payment account portals 28-32 may allow a consumer to open a new account. The payment account portal 28 may comprise an enrollment module 28A, a cards module 28B, a devices module 28C, a favorites module 28D, an account preferences module 28E, a reporting module 28F, and a mobile wallet token generator module 28G. The mobile wallet token generator module 28G may create a mobile wallet token that is transmitted to module 77 of the PCD payment platform when an account holder desires to allow payments for transactions using his or her PCD 100.

FIG. 7C is a diagram illustrating an exemplary account on-line (web) management portal 28, 30, 22 for generating mobile wallet tokens. The on-line portal 28, 30, 32 may provide a user interface for managing any type of an account online. An account that may be designated for payments using a PCD 100 may include, but are not limited to, traditional credit card accounts, like VISA™, MASTERCARD™, DISCOVER™, AMERICAN EXPRESS™, DINERS CLUB™ accounts; alternative payment accounts like PAYPAL™, GOOGLE™, AMAZON™, BILL ME LATER™, Wii™, APPLE™, GREEN DOT™; and mobile phone carrier accounts like SPRINT™, VERIZON™, AT&T™ type accounts; accounts from financial institutions like banks, such as, but not limited to, CHASE™ accounts, BANK OF AMERICA™ accounts; as well as private-label type accounts, such as, but not limited to, merchant based card accounts such as those for specific retail establishments like, THE HOME DEPOT™, WALMART™, NORDSTROM™, SAKS™, etc.

As illustrated in FIG. 7C, an operator may select whether an account may be used for a PCD payments or not with a simple user interface 28G that includes, but is not limited to, a checkbox or drop-down menu as understood by one of ordinary skill in the art. If the operator of the user interface 28G selects an account for PCD payment use, then in block 1210, the corresponding account issuing entity, such as a financial institution 20B or credit card issuer 20A, via the mobile wallet token generator module 28G of FIG. 7B may issue a mobile wallet token that is destined for the PCD payment platform 50 as illustrated in FIG. 1. The delivery of mobile wallet payment tokens from account issuing entities to the PCD payment platform are illustrated with dashed lines 66 between the vault 13, the alternative payment systems 18, the credit cards 20A, the bank cards 20B, and the mobile wallet token receiver-storage/PCD token generator 77.

Figure 8:
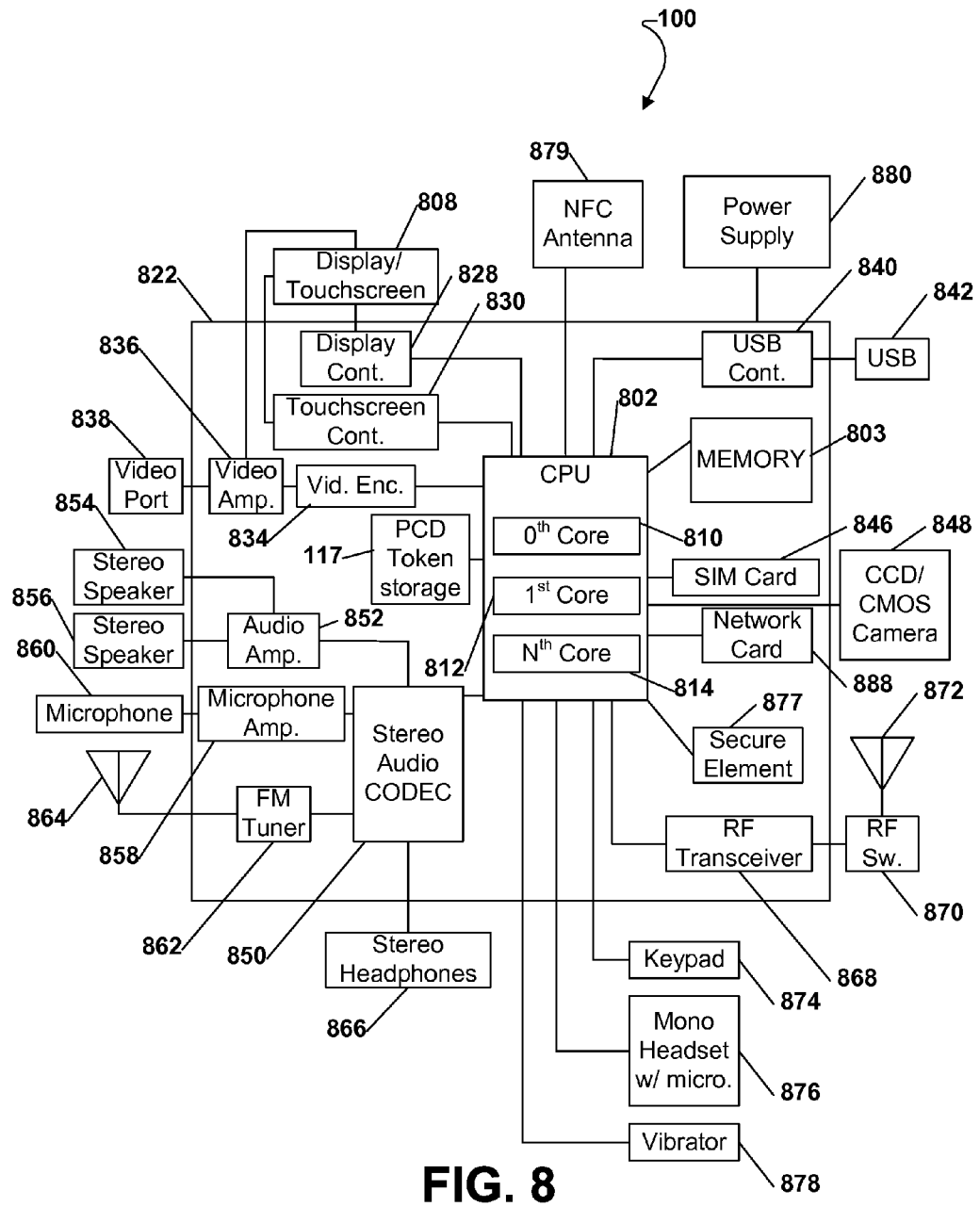
FIG. 8 is a functional block diagram illustrating an exemplary portable computing device ("PCD") that may include PCD token storage.

Referring to FIG. 8, an exemplary, non-limiting aspect of a portable computing device ("PCD") is shown and is generally designated 100. As shown, the PCD 100 includes an on-chip system 822 that includes a multicore CPU 802. The multicore CPU 802 may include a zeroth core 810, a first core 812, and an Nth core 814.

As illustrated in FIG. 8, a display controller 828 and a touch screen controller 830 are coupled to the multicore CPU 802. In turn, a display 808 external to the on-chip system 822 is coupled to the display controller 828 and the touch screen controller 830. An NFC antenna 879 may be coupled to the CPU 802 and may support functions that work in combination with a secure element module 877. The secure element module 877 may comprise software and/or hardware and/or firmware as understood by one of ordinary skill in the art. The CPU 802 may also be coupled to the PCD token storage 117 which may comprise separate hardware and/or software or which may be part of memory 803.

FIG. 8 further shows that a video encoder 834, e.g., a phase alternating line ("PAL") encoder, a sequential color a memoire ("SECAM") encoder, or a national television system(s) committee "(NTSC") encoder, is coupled to the multicore CPU 802. Further, a video amplifier 836 is coupled to the video encoder 834 and the touch screen display 108. Also, a video port 838 is coupled to the video amplifier 836. As shown in FIG. 8, a universal serial bus ("USB") controller 840 is coupled to the multicore CPU 802. Also, a USB port 842 is coupled to the USB controller 840. Memory 404A and a subscriber identity module ("SIM") card 846 may also be coupled to the multicore CPU 802.

Further, as shown in FIG. 8, a camera 848 may be coupled to the multicore CPU 802. In an exemplary aspect, the camera 848 is a charge-coupled device ("CCD") camera or a complementary metal-oxide semiconductor ("CMOS") camera.

As further illustrated in FIG. 8, a stereo audio coder-decoder ("CODEC") 850 may be coupled to the multicore CPU 802. Moreover, an audio amplifier 852 may coupled to the stereo audio CODEC 850. In an exemplary aspect, a first stereo speaker 854 and a second stereo speaker 856 are coupled to the audio amplifier 852. FIG. 8 shows that a microphone amplifier 858 may be also coupled to the stereo audio CODEC 850. Additionally, a microphone 860 may be coupled to the microphone amplifier 858. In a particular aspect, a frequency modulation ("FM") radio tuner 862 may be coupled to the stereo audio CODEC 850. Also, an FM antenna 864 is coupled to the FM radio tuner 862. Further, stereo headphones 866 may be coupled to the stereo audio CODEC 850.

FIG. 8 further illustrates that a radio frequency (RF) transceiver 868 may be coupled to the multicore CPU 802. An RF switch 870 may be coupled to the RF transceiver 868 and an RF antenna 872. As shown in FIG. 4C, a keypad 874 may be coupled to the multicore CPU 802. Also, a mono headset with a microphone 860 may be coupled to the multicore CPU 802. Further, a vibrator device 878 may be coupled to the multicore CPU 802. FIG. 8 also shows that a power supply 880 may be coupled to the on-chip system 822. In a particular aspect, the power supply 880 is a direct current (DC) power supply that provides power to the various components of the PCD 100 that require power. Further, in a particular aspect, the power supply is a rechargeable DC battery or a DC power supply that is derived from an alternating current (AC) to DC transformer that is connected to an AC power source.

FIG. 8 further shows that the PCD 100 may also include a network card 888 that may be used to access a data network, e.g., a local area network, a personal area network, or any other network. The network card 888 may be a Bluetooth network card, a WiFi network card, a personal area network (PAN) card, a personal area network ultra-low-power technology (PeANUT) network card, or any other network card well known in the art. Further, the network card 888 may be incorporated into a chip, i.e., the network card 888 may be a full solution in a chip, and may not be a separate network card 888.

As depicted in FIG. 8, the display 808, the video port 838, the USB port 842, the camera 848, the first stereo speaker 854, the second stereo speaker 856, the microphone 860, the FM antenna 864, the stereo headphones 866, the RF switch 870, the RF antenna 872, the keypad 874, the mono headset 876, the vibrator device 878, and the power supply 880 are external to the on-chip system 822.

In a particular aspect, one or more of the method steps described herein may be stored in the memory 803 as well as in the PCD payment platform 50, merchant enterprise system 16, merchant POS system 12, and other storage devices as computer program instructions. These instructions may be executed by the multicore CPU 802, PCD payment platform 50, merchant enterprise system 16, and merchant POS system 12 in order to perform the methods described herein. Further, the multicore CPU 802, merchant enterprise system 16, merchant POS system 12, other storage devices, and memory 803 of the PCD 100, or a combination thereof may serve as a means for executing one or more of the method steps described herein.

FIG. 9A is a diagram of a screen 900A that shows merchant information 228 relevant to a transaction and a total bill for a purchase along with a plurality of offers 230 which were generated by a tender steering algorithm executed by the tender steering module 744. In this exemplary embodiment, the options 230 were generated by the tender steering module 744. Specifically, the tender steering module 744 of this embodiment generated a 10% off the purchase price if the operator of the PCD 100 uses a new merchant payment account that may be established relatively instantaneously with the portable computing device 100. The tender steering module 744 also produced a 5% off the purchase price if the operator of the PCD 100 utilizes a merchant branded gift card.

FIG. 900B is a diagram of a screen 1200B that shows merchant information relevant to a transaction and a total bill for a purchase along with a plurality of payment options 218B that may be selected by user and which were re-ordered by a tender steering algorithm 744. The payment options 218B may also be characterized as the ranked list of payment account types and the tender steering module 744. As illustrated in FIG. 9B, the tender steering module 744 has presented the merchant gift card payment option first, the merchant branded payment account second, and another type of payment account third. The payment options 218B may be a result of the tender steering module 744 weighing the payment options available to the operator as determined from the data the PCD payment platform 50 receives from the merchant enterprise system 16. As noted previously, the merchant enterprise system 16 and/or the vault 13 determine if an operator of a PCD 100 has an existing merchant payment account, like a credit card account or stored value account, contained in the vault 13 and which may be used as payment for a current transaction.

The final purchase price listed in FIG. 9B is $63.92. Meanwhile the balance remaining on the merchant branded gift card is $8 and the credit limit of the merchant payment account is listed as $1000. In this way, the operator of the PCD 100 may select the merchant branded gift card payment option to be used in combination with the merchant branded payment account. Such a selection of payment options, in some cases, would not require any interchange fees from the merchant. In fact, in some cases, the selection of these two payment options could provide rebates for the merchant as understood by one of ordinary skill the art. By controlling the sequence of display for the payment options, a merchant through the tender steering module 744 may influence or "steer" a consumer towards the payment options which are most beneficial to the merchant.

Figure 10A:
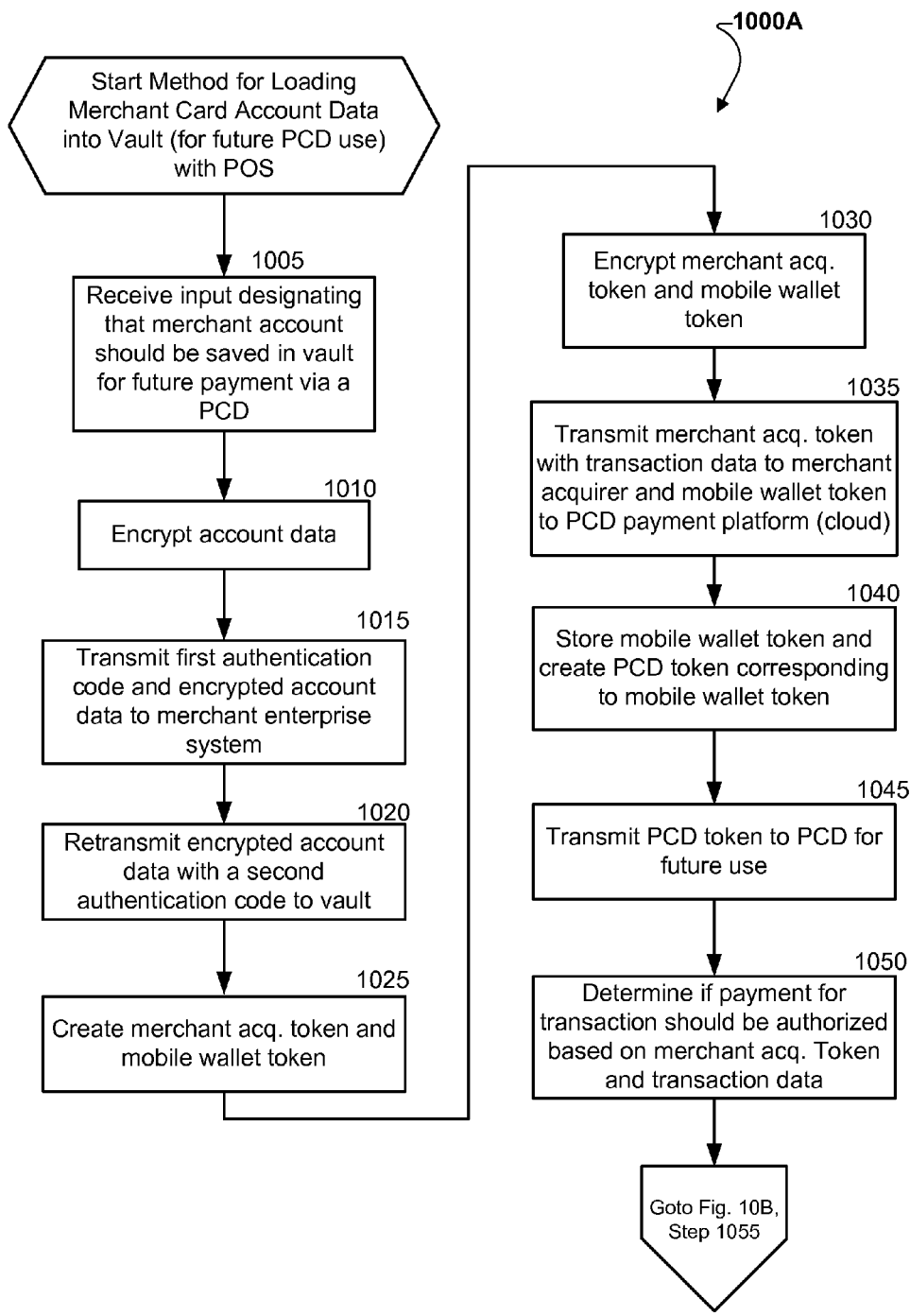
FIGS. 10A-10B are flowcharts illustrating a method for loading merchant card account data into a vault for future PCD use with a point-of-sale terminal.
Figure 10B:
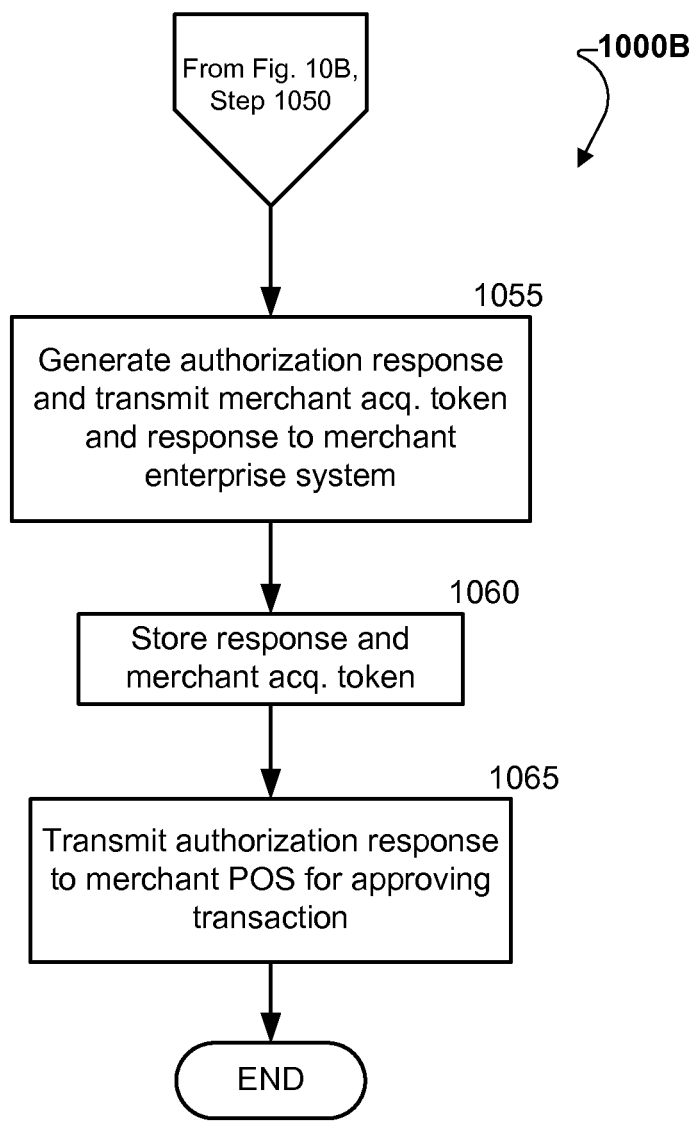

FIGS. 10A-10B are flowcharts illustrating a method 1000 for loading merchant card account data into a vault 13 for future PCD use with a point-of-sale terminal/system 12. Block 1005 is the first step of method 1000A illustrated in FIG. 10A. In block 1005, the point-of-sale system 12, which may include a graphical customer display 131 and a MSR/pinpad 129 as described above in connection with FIG. 4, may receive input designating that a merchant account should be saved in a vault 13 maintained by the merchant for future payment via a PCD 100. In other words, the point-of-sale system 12 may receive a keystroke from an operator of a PCD 100 to indicate that the operator desires data from a current merchant credit card being scanned or swiped to be stored in vault 13 for later use by the PCD 100.

Next, in block 1010, the point-of-sale system 12 encrypts the account data extracted from the credit card scan or swipe. In block 1015, the point-of-sale system transmits a first authentication code and the encrypted credit card account data to the merchant enterprise system 16.

In block 1020, the merchant enterprise system 16 retransmits the encrypted credit card account data with a second authentication code to the vault 13. In block 1025, the vault 13 creates a merchant acquirer token with the encrypted credit card account data. The vault 13 also creates a mobile wallet token destined for the PCD payment platform (cloud) 50.

In block 1030, the vault 13 encrypts the merchant acquirer token and the mobile wallet token. In block 1035, the vault 13 transmits the merchant acquirer token with the transaction data to the merchant acquirer 10 in the mobile wallet token to the PCD payment platform 50. Specifically, the vault 13 transmits the mobile wallet token to the mobile wallet token receiver storage/PCD token generator module 77.

In block 1040, the mobile wallet token receiver storage/PCD token generator module 77 stores the mobile wallet token and creates a PCD token corresponding to the mobile wallet token. Subsequently, in block 1045, the mobile wallet token receiver storage/PCD token generator module 77 transmits the PCD token to the PCD 100 for future use.

In block 1050, the merchant acquirer 10 determines if payment for the transaction should be authorized based on the merchant acquirer token received from the vault 13 and the transaction data. Block 1050 may further comprise additional steps in which the merchant acquirer 10 communicates with the issuing bank for the particular bank card 20B used in the transaction.

The method 1000A continues as method 1000B via block 1055 in FIG. 10B. in block 1055, the merchant acquirer 10 may generate an authorization response and transmit the merchant acquirer token and the response to the merchant enterprise system 16. In block 1060, the merchant enterprise system 16 may store the authorization response in the merchant acquirer token in memory. In block 1065, the merchant enterprise system 16 may transmit the authorization response to the merchant point-of-sale system 12. Then method 1000B may end.

Figure 11A:
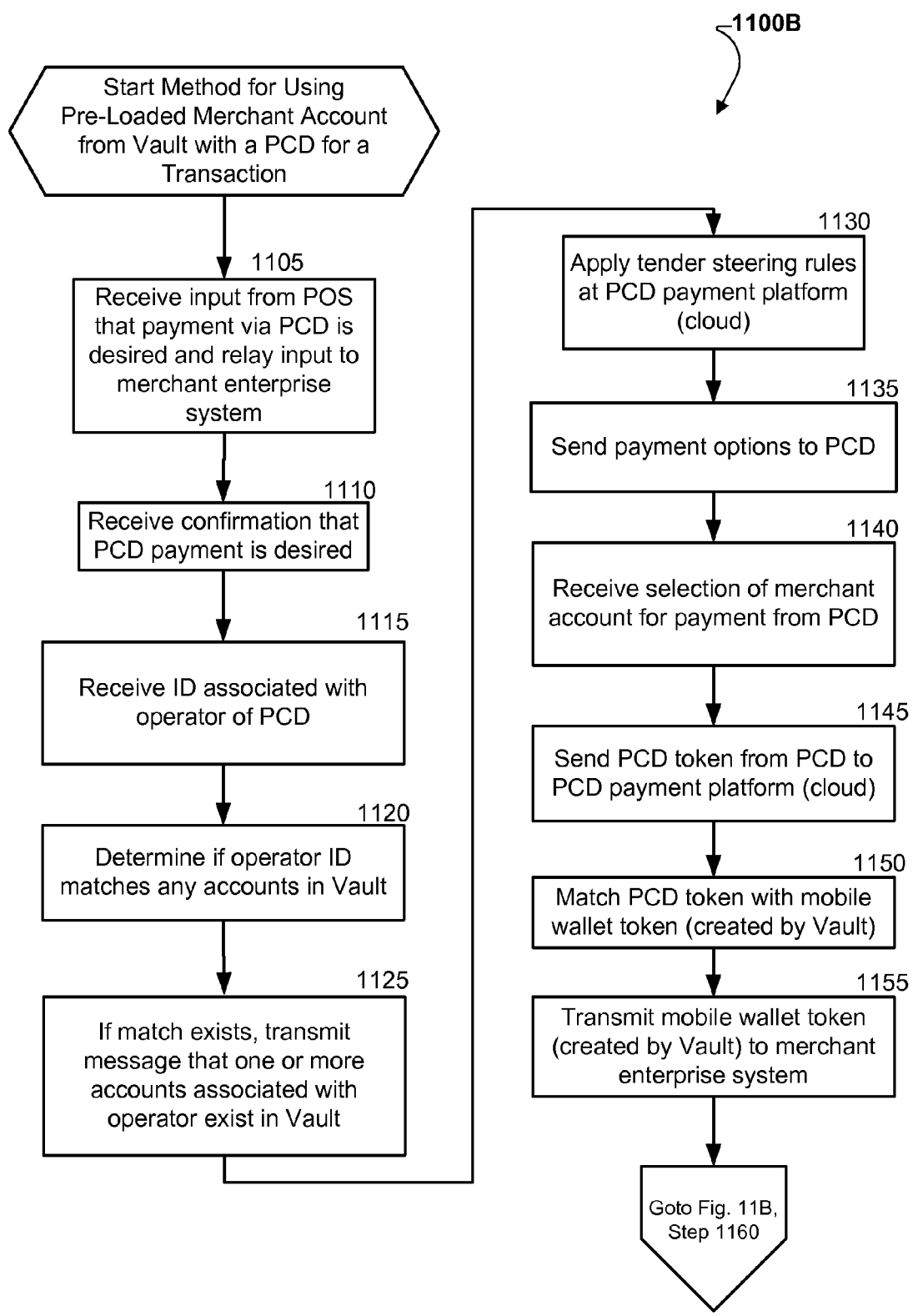
FIGS. 11A-11B are flowcharts illustrating a method for using a preloaded merchant account from a fault with a PCD for completing a payment transaction.
Figure 11B:
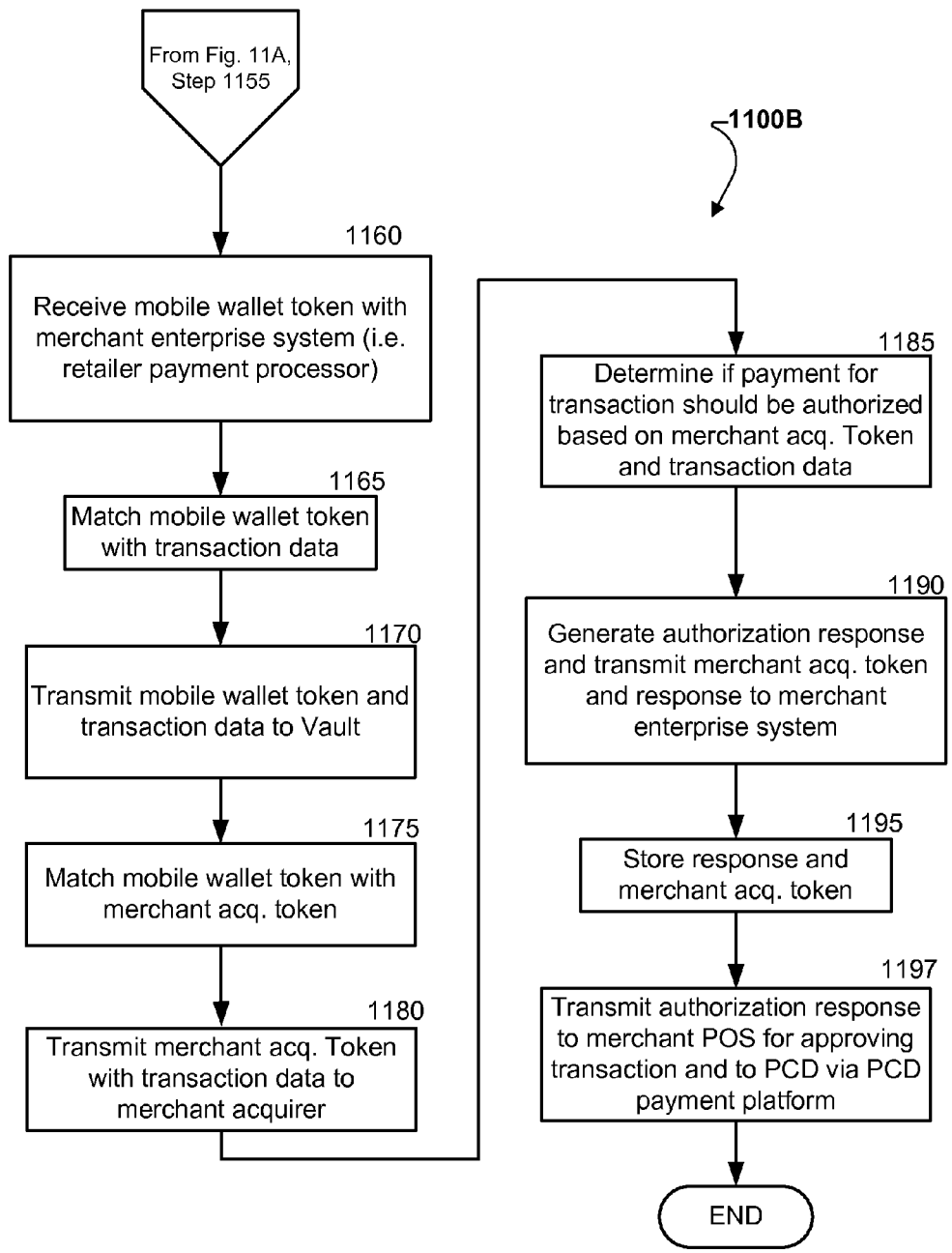

FIGS. 11A-11B are flowcharts illustrating a method 1100 for using a preloaded merchant account from a vault with a PCD 100 for completing a payment transaction. Block 1105 is the first step of the method 1100A. In block 1105, the point-of-sale system 12 may receive input that payment via a PCD 100 as desired and transmit a message to the merchant enterprise system 16. For example, a cashier operating an electronic cash register 412 may key-in that a customer desires to pay for a transaction with her PCD 100 and the electronic cash register 412 may relay a message to the merchant enterprise system 16.

Next, in block 1110, the merchant enterprise 16 may receive confirmation from the PCD payment platform 50 that the customer desires to pay for the transaction with her PCD 100. For example, after the customer informs the cashier operating the electronic cash register 412 that she desires to pay for her transaction with her PCD 100, then the operator of the PCD 100 may scan in the tag 124 of the checkout system 90B as illustrated in FIG. 1 and FIG. 2I. The PCD 100 transmits the data from the tag 124 to the PCD payment platform 50. The PCD payment platform 50, in turn, transmits the data from the tag 124 as well as an identifier for the operator of the PCD 100 to the merchant enterprise system 16.

Next, in block 1115, the merchant enterprise system 16 receives the identifier associated with the operator of the PCD 100. In block 1120, the merchant enterprise system 16 determines if the identifier associated with the operator of the PCD 100 matches any accounts in the vault 13. Next, in block 1125 if a match exists in the vault 13, then the merchant enterprise system 16 transmits a message to the PCD payment platform 50 which contains a list of the matching accounts listed in the vault 13. This list may enumerate mobile wallet tokens that were created previously as described above in connection with block 1025 of FIG. 10A.

Next, in block 1130, the PCD payment platform 50 may apply tender steering rules based on its internal data, such as preferences expressed by the operator of the PCD 100, as well as the messages the PCD payment platform 50 receives from the merchant enterprise system 16 about matching accounts in the vault 13. Further details about the tender steering process are described above in connection with FIG. 9A-9B.

Subsequently, in block 1135, the PCD payment platform 50 transmits the payment options for completing the transaction to the PCD 100 for selection by the operator. In block 1140, a merchant account for payment for completing the transaction is selected by the operator of the PCD 100.

Next, in block 1145, the PCD token corresponding to the merchant account selected in block 1140 is transmitted by the PCD 100 to the PCD payment platform 50. In block 1150, the PCD payment platform 50 matches the PCD token with the mobile wallet token in its database which was previously created and sent by the vault 13 in block 1035 of FIG. 10A.

In block 1155, the PCD payment platform 50 transmits the mobile wallet token associated with the selected merchant account to the merchant enterprise system 16. The method 1100A then continues to block 1160 as illustrated on FIG. 11B.

FIG. 11B illustrates a continuation flowchart diagram of the method 1100B which corresponds with method 1100A of FIG. 11A. Block 1160 is the first block of continuation method 1100B of FIG. 11B. In block 1160, the merchant enterprise system 16 receives the mobile wallet token transmitted from the PCD payment platform 50. The merchant enterprise system 16 matches the mobile wallet token with the transaction data it has received from the point-of-sale system 12 in block 1165.

Next, in block 1170, the merchant enterprise system 16 transmits the mobile wallet token and the transaction data to the vault 13. In block 1175, the vault 13 matches the mobile wallet token with the merchant acquirer token stored in its database within the vault 13. The vault 13 then transmits the merchant acquirer token with the transaction data to the merchant acquirer 10 in block 1180.

In block 1185, the merchant acquirer 10 in communication/combination with the bank card system 20B, determines if the payment for the transaction should be authorized based on the merchant acquirer token and the transaction data received. If the transaction should be authorized, then in block 1190, the merchant acquirer 10 and/or the bank card system 20 may generate an authorization response and transmit the merchant acquirer token and the response to the merchant enterprise system 16 where this response is logged/stored (block 1195).

In block 1197, the merchant enterprise system 16 transmits the authorization response to the merchant point-of-sale system 12 for proving the payment for the transaction. The process then ends.

Figure 12:
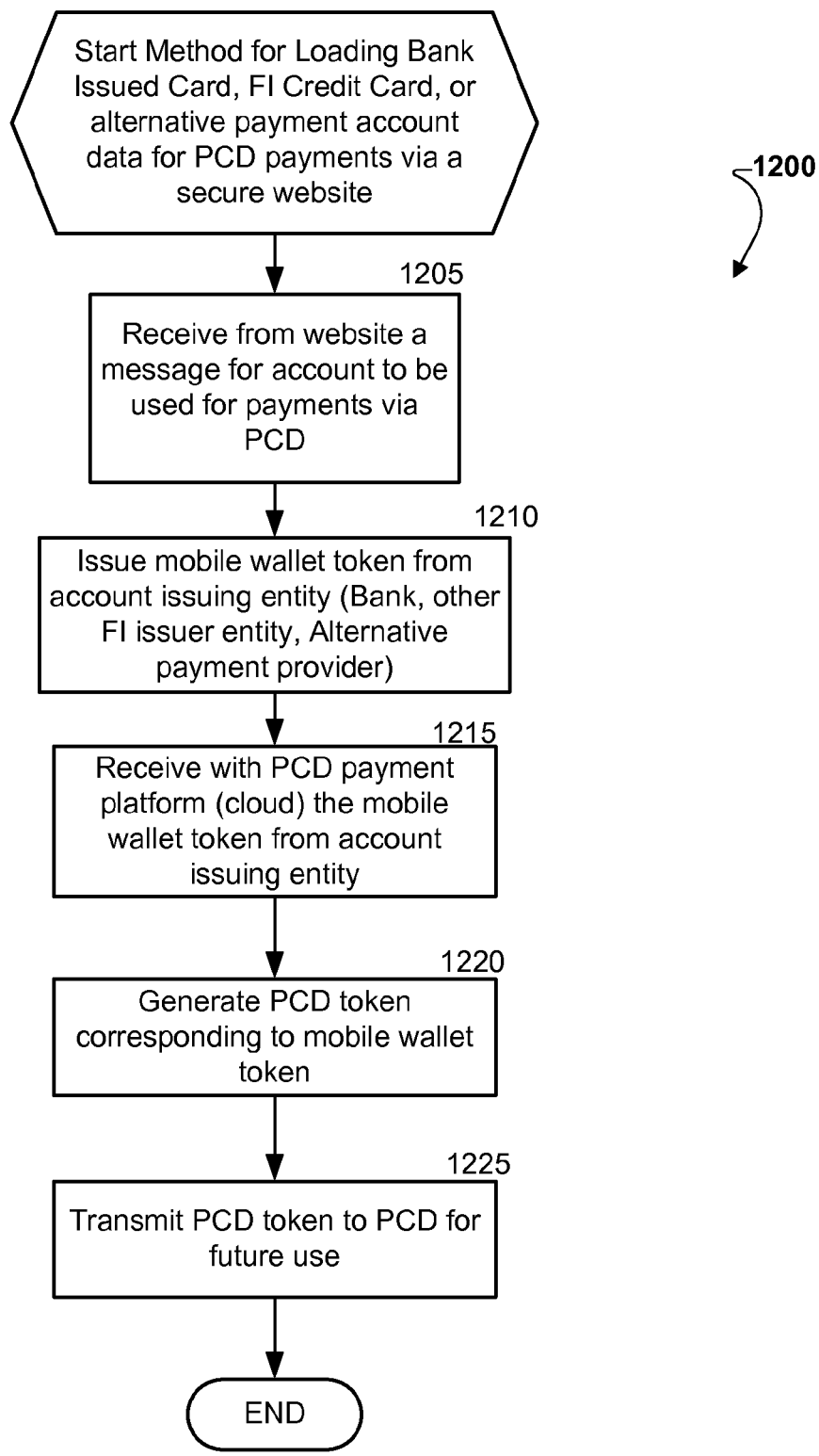
FIG. 12 is a flowchart illustrating a method for loading bank issued card data, financial institution ("other card issuer") credit card data, or alternative payment account data for PCD payments via a secure online portal (i.e., a website)

FIG. 12 is flowchart illustrating a method 1200 for loading bank issued card data, financial institution ("other card issuer") credit card data, or alternative payment account data for PCD payments via a secure online portal (i.e., a website) 28, 30, 32. Block 1205 is the first block of method 1200. In block 1205, a message may be received from an online portal 28, 30, 32 that an account may be used for payments via a PCD 100. For example, as illustrated in FIG. 7C described above, an online portal 28, 30, 32 may provide a user interface for managing any type of an account online. As described above, an account that may be designated for payments using a PCD 100 may include, but are not limited to, traditional credit card accounts, like VISA™, MASTERCARD™, DISCOVER™, AMERICAN EXPRESS™, DINERS CLUB™ accounts; alternative payment accounts like PAYPAL™, GOOGLE™, AMAZON™, BILL ME LATER™, Wii™, APPLE™, GREEN DOT™; and mobile phone carrier accounts like SPRINT™, VERIZON™, AT&T™ type accounts; accounts from financial institutions like banks, such as, but not limited to, CHASE™ accounts, BANK OF AMERICA™ accounts; as well as private-label type accounts, such as, but not limited to, merchant based card accounts such as those for specific retail establishments like, THE HOME DEPOT™, WALMART™, NORDSTROM™, SAKS™, etc.

As illustrated in FIG. 7C, an operator may select whether an account may be used for a PCD payments or not with a simple user interface 28G, that includes, but is not limited to, a checkbox or drop-down menu as understood by one of ordinary skill in the art. If the operator of the user interface 28G selects an account for PCD payment use, then in block 1210, the corresponding account issuing entity, such as a financial institution 20B or credit card issuer 20A, may issue a mobile wallet token that is destined for the PCD payment platform 50 as illustrated in FIG. 1 by the dashed lines 66 between the alternative payment systems 18, the credit cards 20A, the bank cards 20B, and the mobile wallet token receiver-storage/PCD token generator 77.

In block 1215, the PCD payment platform 50 via the mobile wallet token receiver-storage/PCD token generator 77 receives the mobile wallet token from the account issuing entity. In block 1220, the PCD payment platform 50, and specifically the mobile wallet token receiver-storage/PCD token generator 77, creates the PCD token corresponding to the mobile wallet token received from the account issuing entity.

In block 1225, the mobile wallet token receiver-storage/PCD token generator 77 transmits the PCD token to the PCD 100 for future use in a payment transaction. Method 1200 then ends.

Figure 13A:
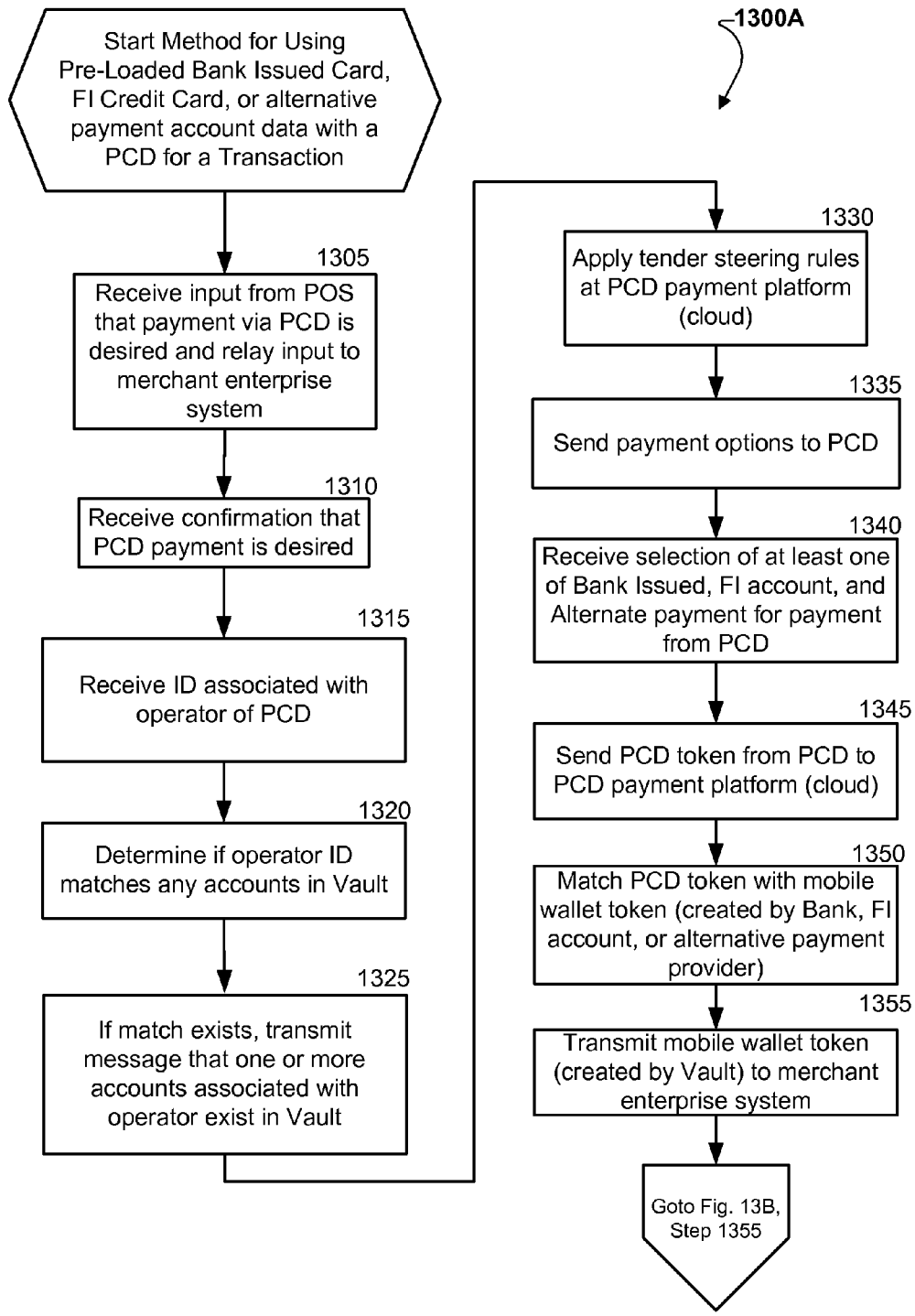
FIGS. 13A-13B are flowcharts illustrating a method for using preloaded bank issued card data, financial institution ("other card issuer") credit card data, or alternative payment account data with a PCD for a payment transaction.
Figure 13B:
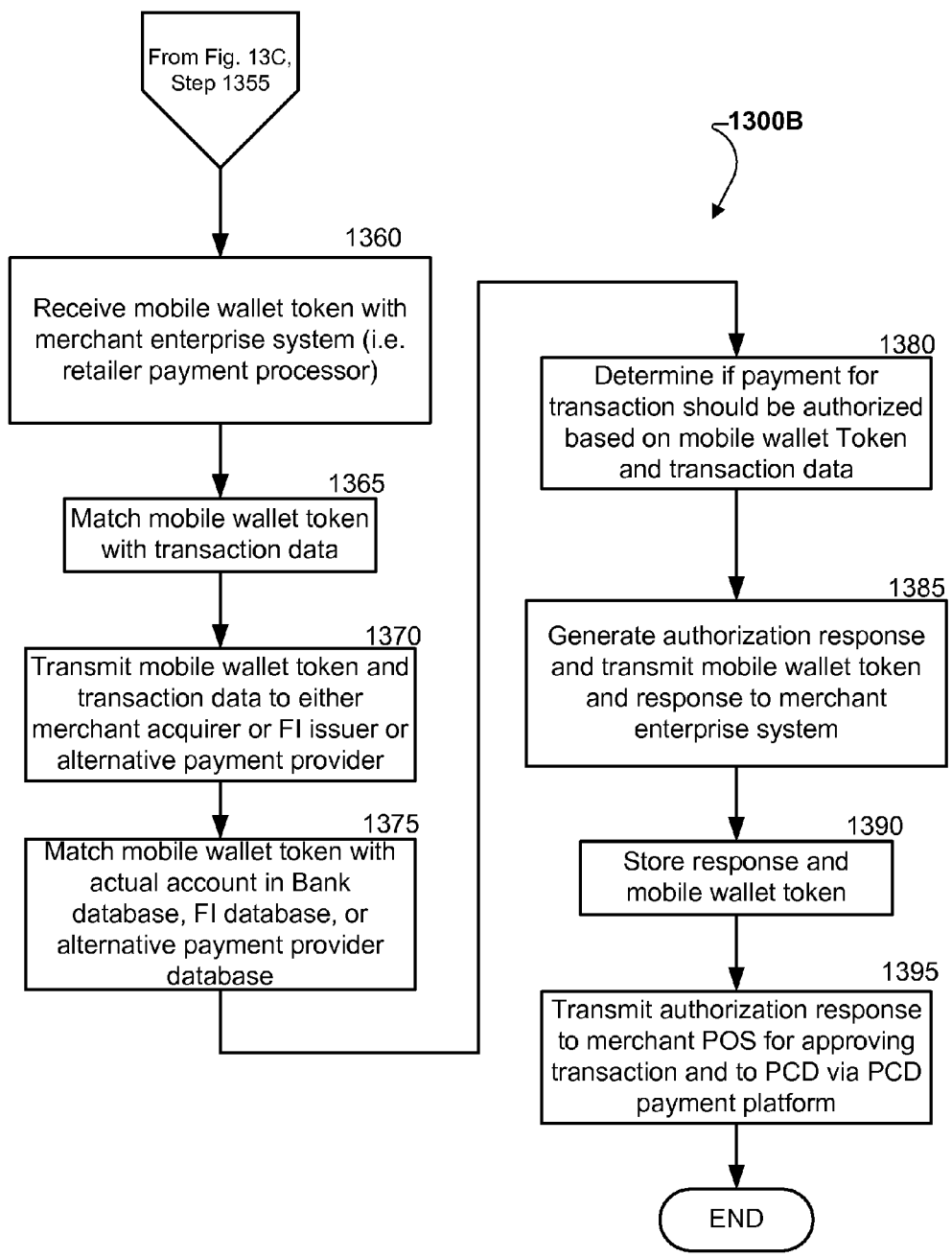

FIGS. 13A-13B are flowcharts illustrating a method 1300 for using preloaded bank issued card data, financial institution ("other card issuer") credit card data, or alternative payment account data with a PCD 100 for a payment transaction. Block 1305 is the first block of method 1300A. In block 1305, the point-of-sale system 12 may receive input that payment via a PCD 100 is desired by the customer who would like to complete a payment transaction for a good or service.

Next, in block 1310, the merchant enterprise 16 may receive confirmation from the PCD payment platform 50 that the customer desires to pay for the transaction with her PCD 100. For example, after the customer informs the cashier operating the electronic cash register 412 that she desires to pay for her transaction with her PCD 100, then the operator of the PCD 100 may scan in the tag 124 of the checkout system 90B as illustrated in FIG. 1 and FIG. 2I. The PCD 100 transmits the data from the tag 124 to the PCD payment platform 50. The PCD payment platform 50, in turn, transmits the data from the tag 124 as well as an identifier for the operator of the PCD 100 to the merchant enterprise system 16.

Next, in block 1315, the merchant enterprise system 16 receives the identifier associated with the operator of the PCD 100. In block 1320, the merchant enterprise system 16 and/or vault 13 determines if the identifier associated with the operator of the PCD 100 matches any accounts in the vault 13. Next, in block 1325 if a match exists in the vault 13, then the merchant enterprise system 16 transmits a message to the PCD payment platform 50 which contains a list of the matching accounts listed in the vault 13. This list may enumerate mobile wallet tokens that were created previously as described above in connection with block 1025 of FIG. 10A.

Next, in block 1330, the PCD payment platform 50 may apply tender steering rules based on its internal data, such as preferences expressed by the operator of the PCD 100, as well as the messages the PCD payment platform 50 receives from the merchant enterprise system 16 about matching accounts in the vault 13. Further details about the tender steering process are described above in connection with FIG. 9A-9B.

Subsequently, in block 1335, the PCD payment platform 50 transmits the payment options for completing the transaction to the PCD 100 for selection by the operator of the PCD 100. In block 1340, a bank issued, a financial institution, or an alternative payment provider account may be selected for payment to complete the transaction by the operator of the PCD 100.

Next, in block 1345, the PCD token corresponding to the account selected in block 1340 by the operator is transmitted by the PCD 100 to the PCD payment platform 50. In block 1350, the PCD payment platform 50 matches the PCD token with the mobile wallet token in its database which was previously created and sent by account issuing entity in block 1210 of FIG. 12.

In block 1355, the PCD payment platform 50 transmits the mobile wallet token associated with the selected account to the merchant enterprise system 16. The method 1300A then continues to block 1360 as illustrated on FIG. 13B.

FIG. 13B illustrates a continuation flowchart diagram of the method 1300B which corresponds with method 1300A of FIG. 11A. Block 1360 is the first block of continuation method 1300B of FIG. 13B. In block 1360, the merchant enterprise system 16 receives the mobile wallet token transmitted from the PCD payment platform 50. The merchant enterprise system 16 matches the mobile wallet token with the transaction data it has received from the point-of-sale system 12 in block 1365.

Next, in block 1370, the merchant enterprise system 16 transmits the mobile wallet token and the transaction data to the appropriate account issuing entity. The account issuing entity may be a bank, such as bank card system 20B, another type of financial institution or credit card issuer, such as credit card system 20A, or an alternative payment provider, such as alternative payment systems as illustrated in FIG. 1.

In block 1375, the account issuing entity matches the mobile wallet token with its account data in its database. The account issuing entity then determines if payment for the transaction should be authorized based on the mobile wallet matching and the transaction data in block 1380.

In block 1385, the account issuing entity may generate an authorization response and transmit the mobile wallet token and the response to the merchant enterprise system 16 where this response is logged/stored (block 1390).

In block 1395, the merchant enterprise system 16 transmits the authorization response to the merchant point-of-sale system 12 for proving the payment for the transaction. The process then ends.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the scope of the disclosure, as defined by the following claims.

What is claimed is:

1. A method for managing payment of a purchase transaction with a portable computing device, comprising:

receiving by a portable computing device payment platform a mobile wallet token from an account issuing entity;

storing by the portable computing device payment platform the mobile wallet token in memory within the portable computing device payment platform;

generating by the portable computing device payment platform a portable computing device token that corresponds to the mobile wallet token;

transmitting by the portable computing device payment platform the portable computing device token over a communications network to the portable computing device;

receiving by the portable computing device payment platform the portable computing device token from the portable computing device, wherein the portable computing device token is associated with a purchase transaction;

matching by the portable computing device payment platform the portable computing device token received from the portable computing device with its corresponding mobile wallet token received from the account issuing entity; and transmitting by the portable computing device payment platform the matching mobile wallet token to a merchant system associated with the purchase transaction, wherein the mobile wallet token is configured to be used by the merchant system for settlement of the purchase transaction.

2. The method of claim 1, wherein the mobile wallet token corresponds to at least one of: a credit card account, an alternative or non-traditional payment account, a stored value account, an account from a financial institution, and a merchant based card account.

3. The method of claim 1, further comprising:
the account issuing entity generating a mobile wallet token in response to the account issuing entity receiving input from a point-of-sale system that future use of a payment account with the portable computing device is desired.

4. The method of claim 1, further comprising:
the account issuing entity generating a mobile wallet token in response to the account issuing entity receiving input from an on-line portal that future use of a payment account with the portable computing device is desired.

5. The method of claim 1, further comprising:
arranging a listing of payment accounts according to one or more rules; and
transmitting the listing over a communications network.

6. The method of claim 1, wherein the portable computing device comprises at least one of a mobile telephone, a personal digital assistant, a pager, a smartphone, a navigation device, a tablet PC, and a hand-held computer with a wireless connection or link.

7. A computer system for managing payment of a purchase transaction with a portable computing device, the system comprising:
a portable computing device payment platform; and
a mobile wallet token module coupled to the portable computing device payment platform,
wherein the mobile wallet token module receives a mobile wallet token from an account issuing entity;
wherein the portable computing device payment platform stores in memory within the portable computing device payment platform the mobile wallet token received by the mobile wallet token module;
wherein the mobile wallet token module generates a portable computing device token that corresponds to the mobile wallet token;
wherein the mobile wallet token module transmits the portable computing device token over a communications network to the portable computing device;
wherein the portable computing device token is associated with a purchase transaction and the portable computing device payment platform receives the portable computing device token from the portable computing device;
wherein the portable computing device payment platform matches the portable computing device token received from the portable computing device with its corresponding mobile wallet token received by the mobile wallet token module from the account issuing entity; and
wherein the mobile wallet token is configured to be used by a merchant system associated with the purchase transaction for settlement of the purchase transaction and the portable computing device payment platform transmits the matching mobile wallet token to the merchant system.

8. The system of claim 7, wherein the mobile wallet token corresponds to at least one of: a credit card account, an alternative or non-traditional payment account, a stored value account, an account from a financial institution, and a merchant based card account.

9. The system of claim 7, wherein the account issuing entity generates a mobile wallet token in response to receiving input from a point-of-sale system that future use of a payment account with the portable computing device is desired.

10. The system of claim 7, wherein the account issuing entity generates a mobile wallet token in response to receiving input from an on-line portal that future use of a payment account with the portable computing device is desired.

11. The system of claim 7, wherein the account issuing entity
arranges a listing of payment accounts according to one or more rules; and
transmits the listing over a communications network.

12. The system of claim 7, wherein the portable computing device comprises at least one of a mobile telephone, a personal digital assistant, a pager, a smartphone, a navigation device, a tablet PC, and a hand-held computer with a wireless connection or link.

13. A computer program product comprising a non-transitory computer usable medium having a computer readable program code embodied therein, said computer readable program code adapted to be executed to implement a method for managing payment of a purchase transaction with a portable computing device, said method comprising:
receiving by a portable computing device payment platform a mobile wallet token from an account issuing entity;
storing by the portable computing device payment platform the mobile wallet token in memory within the portable computing device payment platform;
generating by the portable computing device payment platform a portable computing device token that corresponds to the mobile wallet token;
transmitting by the portable computing device payment platform the portable computing device token over a communications network to the portable computing device;
receiving by the portable computing device payment platform the portable computing device token from the portable computing device, wherein the portable computing device token is associated with a purchase transaction;
matching by the portable computing device payment platform the portable computing device token received from the portable computing device with its corresponding mobile wallet token received from the account issuing entity; and
transmitting by the portable computing device payment platform the matching mobile wallet token to a merchant system associated with the purchase transaction, wherein the mobile wallet token is configured to be used by the merchant system for settlement of the purchase transaction.

14. The computer program product of claim 13, wherein the mobile wallet token corresponds to at least one of: a credit card account, an alternative or non-traditional payment account, a stored value account, an account from a financial institution, and a merchant based card account.

15. The computer program product of claim 13, wherein the program code implementing the method further comprises:
   generating a mobile wallet token in response to the account issuing entity receiving input from a point-of-sale system that future use of a payment account with the portable computing device is desired.

16. The computer program product of claim 13, wherein the program code implementing the method further comprises:
   generating a mobile wallet token in response to the account issuing entity receiving input from an on-line portal that future use of a payment account with the portable computing device is desired.

17. The computer program product of claim 13, wherein the program code implementing the method further comprises:
   arranging a listing of payment accounts according to one or more rules; and
   transmitting the listing over a communications network.

18. The computer program product of claim 13, wherein the portable computing device comprises at least one of a mobile telephone, a personal digital assistant, a pager, a smartphone, a navigation device, and a hand-held computer with a wireless connection or link.

* * * * *